United States Patent
Endo et al.

(10) Patent No.: US 6,950,195 B2
(45) Date of Patent: Sep. 27, 2005

(54) INTERFERENCE MEASURING DEVICE

(75) Inventors: Junji Endo, Sakado (JP); Jun Chen, Atsugi (JP)

(73) Assignees: Hitachi, Ltd., Tokyo (JP); Japan Science and Technology Agency, Saitama (JP)

( * ) Notice: Subject to any disclaimer, the term of this patent is extended or adjusted under 35 U.S.C. 154(b) by 69 days.

(21) Appl. No.: 10/240,201

(22) PCT Filed: Mar. 28, 2001

(86) PCT No.: PCT/JP01/02534

§ 371 (c)(1),
(2), (4) Date: Apr. 9, 2003

(87) PCT Pub. No.: WO01/75394

PCT Pub. Date: Oct. 11, 2001

(65) Prior Publication Data

US 2003/0160969 A1 Aug. 28, 2003

(30) Foreign Application Priority Data

| Mar. 30, 2000 | (JP) | ............. | 2000-097877 |
| Aug. 7, 2000 | (JP) | ............. | 2000-244031 |

(51) Int. Cl.[7] ................................................ G01B 9/02
(52) U.S. Cl. .................................................... 356/520
(58) Field of Search ............................... 356/520, 521, 356/512, 515, 511, 497

(56) References Cited

U.S. PATENT DOCUMENTS

| 4,459,027 A | * | 7/1984 | Kafri et al. ................. 356/605 |
| 4,653,855 A | * | 3/1987 | Birnbach et al. ............ 324/310 |
| 4,935,625 A | * | 6/1990 | Hasegawa et al. .......... 250/306 |
| 5,192,867 A | * | 3/1993 | Osakabe et al. ............ 250/311 |
| 5,426,521 A | * | 6/1995 | Chen et al. ..................... 359/9 |
| 5,432,347 A | * | 7/1995 | Coene ......................... 250/307 |
| 5,446,589 A | * | 8/1995 | Ru et al. ..................... 359/577 |
| 5,767,521 A | * | 6/1998 | Takeno et al. ........... 250/492.2 |
| 6,215,578 B1 | * | 4/2001 | Lin ............................. 359/292 |

FOREIGN PATENT DOCUMENTS

| JP | 10-199464 | 7/1998 | ............. H01J/37/26 |
| JP | 11-40097 | 2/1999 | .......... H01J/37/295 |

OTHER PUBLICATIONS

M. Takeda, "Subfringe Interference Measurement Basic Theory", Optics 13 (1984) pp. 55–65.

T. Yatagi et al., "Quantitative Phase Analysis in Electron Holographic Interferometry". Appl. Opt. 26 (1987), pp. 337–382.

(Continued)

Primary Examiner—Andrew H. Lee
(74) Attorney, Agent, or Firm—Antonelli, Terry, Stout and Kraus, LLP.

(57) ABSTRACT

In an interference measuring device, which includes: a coherent beam generating source; a sample to be measured; a lens system for forming an image of the sample to be measured on an observing plane; an interference element for splitting a coherent beam into two systems, and forming an interference image on the observing plane or a plane equivalent thereto; an image pickup element for picking up the interference image on the observing plane; and a calculating device having functions of capturing and storing the interference image converted to electric signals by the image pickup element, and determining the phase distribution changed by the sample to be measured from the interference image by calculation, wherein a means for removing the phase change distribution due to the interference element is provided.

21 Claims, 13 Drawing Sheets

OTHER PUBLICATIONS

J. Endo et al., "Interference Electron Microscopy by Means of Holography". Japan. J. Appl. Phys, 18 (1979) pp. 2291–2294.

J.F. Biegen et al., "High Resolution Phase Measuring Laser Interferometric Microscope for Engineering Surface Metrology", SPIE 1009 (1998). pp. 35–44.

J. Endo et al., "New Development in Electron Interference Measurement". Electron Microscopy 30 (1995) pp. 113–120.

J. Chen et al., "Quantitative Measurement of a Phase Object by Fringe Scanning Interference Microscopy", Appl. Opt. 28 (1989) pp. 1615–1617.

* cited by examiner

Interference image

Sample

5 μm

INTERFERENCE MEASURING DEVICE

BACKGROUND OF THE INVENTION

The present invention particularly relates to an interference measuring device belonging to a wavefront splitting type among interference measuring devices.

The interferometers often used for interference measurement using a laser include: Twyman-Green interferometer (ex., reference literature 1: Subfringe Interference Measurement Basic Theory, Optics 13 (1984) p.p. 55–65, or reference literature 2: Quantitative Phase Analysis in Electron Holographic Interferometry, Appl. Opt. 26 (1987) 377–382), Mach-Zehnder interferometer (reference literature 3: Interference Electron Microscopy by Means of Holography, Japan, J. Appl. Phys. 18 (1979) 2291–2294), further, Fizeau interferometer (reference literature 4: High Resolution Phase Measuring Laser Interferometric Microscope for Engineering Surface Metrology, SPIE 1009 (1988) 35–44), and the like. Any of the interferometers is of an amplitude splitting type which splits one beam into two beams, a beam transmitted through a semitransparent mirror and a beam reflected thereby.

On the other hand, also in the field of an electron beam, a study has been made on the measurement of not only the shape of an object but also the distribution of the electromagnetic field in the vicinity of a sample utilizing the phase information of an electron wave. The electron beam interferometer practically includes only an electron beam biprism (ex., reference literature 5: New Development in Electron Interference Measurement, Electron Microscopy 30 (1995) 113–120), reference literature 6: Japanese Laid-Open Patent Publication No. Hei 10-199464, and reference literature 7: Japanese Laid-Open Patent Publication No. Hei 11-40097). It is of a wavefront splitting type which spatially splits a beam into two beams, for example, a right-half beam and a left-half beam. There are not many cases where the wavefront splitting type is used for optical interference measurement.

In interference measurement, a beam changed in phase by a sample to be measured and a reference beam are allowed to interfere with each other to form an interference image. The distribution of phase changes due to the sample to be measured is examined from the resulting interference image. The information obtained from the distribution of phase changes varies according to the construction of the interference system. In the field of laser optics, the most common case is where the information is applied to the measurements of the surface precision and shape of the surface, unevenness of the thickness, and the like, of the sample to be measured. In the field of electron interference, the measurement of the distribution of electromagnetic field is also an important application other than the measurement of the shape of the sample to be measured.

As a method for calculating the distribution of phase changes from the interference image, for example, mention may be made of the following method. One interference image is inputted and stored into a calculating device via an image pickup element and an image capture board. This is mathematically Fourier transformed, so that there occur ±primary spectra corresponding to the basic interference fringes determined by the angle formed between two interfering luminous fluxes and the directions thereof with the center of the Fourier spectrum diagram as a center of point symmetry. The phase-changed components due to the sample are distributed around the + primary and − primary spectra, which are equivalent to each other. Therefore, one spectrum is selected with a window having a proper size to be Fourier inverse transformed. As a result, the distribution of phase is reproduced.

The phase distribution includes the tilt components due to the angle formed between the two luminous fluxes which have been allowed to interfere with each other. Therefore, the selected spectrum is shifted to the origin point, and then Fourier inverse transformed, or it is Fourier inverse transformed, and then the tilt component is corrected. As a result, it is possible to determine the distribution of phases changed by the sample.

The method most commonly used for a high-precision interference measurement is the fringe scanning method (also referred to as a phase shift method, in section 3.2 on page 58 of the reference literature 1). The detail of the measurement principle of this method is described on pages 58 to 59 of the reference literature 1, and hence a detailed description thereon is omitted. To be brief, the measurement principle is as follows.

With this method, in general, only the conditions for forming interference fringes are changed, so that the resulting interference image is recorded while successively shifting the relative phase difference between an object wave and a reference wave at an observing plane by a 1/M the wavelength (M is a positive integer of 3 or more). From the recorded M-interference-image group data, the distribution $\phi(x,y)$ of the phases changed by the sample is expressed as the following equation (1):

$$\phi(x, y) = \tan^{-1}\left[\frac{\sum_{m=1}^{M} I(x, y; m)\sin\left(\frac{2\pi n}{M}\right)}{\sum_{m=1}^{M} I(x, y; m)\cos\left(\frac{2\pi m}{M}\right)}\right] \quad (1)$$

where I(x,y;m) denotes the intensity distribution of the interference image captured for the m-th time. The relative phase difference between the object wave and the reference wave is generally changed in the following manner. A reflecting mirror or a semitransparent mirror is micro-moved by a piezoelectrically driven stage, or the like, thereby to change the optical path length of the reference beam. This method is also used for electron interference. In this case, the relative phase difference between the object wave and the reference wave is changed in the following manner. Namely, an electron beam biprism is moved, or the tilt of the beam to be irradiated onto a sample to be measured is changed.

In the field of laser optics, high-precision interference measuring devices are mostly of a reflection type on the order of equal magnification, and there are less examples of microscopes of a reflection type (the reference literature 4). There are further less examples of transmission type microscopes, although there is the example of Mach-Zehnder interferometer using a Koster prism (reference literature 8: Quantitative measurement of a phase object by fringe scanning interference microscopy, Appl. Opt. 28 (1989) 1615–1617). In any of these examples, splitting of beams is accomplished based on the amplitude splitting type. In the field of electron beam, in most cases, the wavefront splitting type and transmission type microscopes are employed from the restriction of the interferometer.

Also in the field of laser optics, the configuration of a transmission type microinterferometer system based on the wavefront splitting mode has a large merit. With the transmission type microinterferometer system, although the beam transmitted through the sample is enlarged by the use of a lens system, the reference beam is also required to be enlarged simultaneously. With the transmission type micro-interferometer system of the amplitude splitting mode, the two split luminous fluxes pass through largely different paths, and hence tend to be affected by vibration. Thus, a very large magnifying lens is required to be inserted, alternatively, the same magnifying systems are required to be inserted to their respective optical paths as in the reference literature 8. In contrast, with the wavefront splitting mode, the two luminous fluxes pass through almost the same paths, and hence they are less susceptible to vibration. Accordingly, only one system is required as the magnifying lens system.

In order to carry out the fringe scanning method with the interference system of the wavefront splitting type, the relative positional relationship between a sample image and interference fringes is required to be shifted on the observing plane. To do this, for example, the following methods are conceivable.

1. The wavefront splitting element is moved in the direction orthogonal to the wavefront splitting boundary;
2. The tilt of the exposure beam is changed in the direction orthogonal to the wavefront splitting boundary;
3. The refractive index of the wavefront splitting element is changed;
4. A phase modulation element (ex., liquid crystal plate) is inserted in at least one of the object wave or the reference wave to change the phase; and
5. When alignment is performed in the calculating device, the sample is moved with the interference conditions left unchanged.

The first, second, and fifth methods can be readily applied to any of the laser interference system and the electron beam interference system. However, the third method and the fourth method are practically difficult to be applied to the laser interference system and the electron beam interference system, respectively.

FIG. 1 shows an example of a configuration of a wavefront splitting type fringe scanning laser interference measuring device. In this example, there is shown a method in which a biprism 5 which is a wavefront splitting element is moved, thereby to change the relative positional relationship between a sample image and interference fringes. A beam emitted from a coherent beam source (a laser in this case) 1 is converted to a parallel light by collimator lenses 2 and 3, and irradiated to a sample 10. When the sample 10 is small, the collimator lenses are not necessarily required. The transmission image of the sample 10 is formed on an observing plane 21 by using an objective lens 4. In this example, the image is formed directly on the image pickup surface of an image pickup element 20. The beam transmitted through the sample 10 (the portion of the dotted area in the figure) 11 has been changed in phase according to the distribution of the refractive index for the exposure beam in the sample. A wavefront splitting element in triangle pole (herein, also referred to as a biprism) 5 is placed at an appropriate position between the objective lens 4 and the observing plane 21. Thus, the beam transmitted through the sample 10 (hatching slanting downwardly to the right: generally referred to as an object wave) 12 passes through the focal point of the objective lens 4, and then, passes through the upper part of the biprism 5 to be deflected closer to an optical axis 13. Whereas, the beam passed through the part where there is no sample (hatching portion slanting upwardly to the right: generally referred to as a reference wave) 14 is deflected in the opposite direction. As a result, interference fringes are formed at the overlapping portion of both (crosshatching portion) 15. On the observing plane 21, there occur linear interference fringes in the sample-less portion. Whereas, there are observed interference fringes deviated from straight lines in proportional to the phase distribution of the transmission beam.

A reference numeral 30 denotes a monitor for image observation. It converts a signal from the image pickup element 20 into an image, and displays it. A reference numeral 50 denotes a calculating device, to which a monitor for a calculating device 60 is connected. Thus, it performs the operation and management of a laser interference system. A reference numeral 51 denotes an image capture board, which is an interface for capturing a signal from the monitor 30 for image observation into the calculating device 50. Incidentally, the monitor 30 for image observation is capable of also serving as the monitor 60 for a calculating device. On the monitor for image observation 30, as with the case on the observing plane 20, there occur linear interference fringes in the sample-less portion, while there are observed interference fringes shifted in accordance with the phase distribution of the transmission beam in the sample-including portion.

In order to carry out the fringe scanning interferometry, herein, a signal is sent to a micro-movement control device 40 in response to an instruction via the calculating device 50 from an observer, so that a micro-movement control mechanism 41 by a piezo element is micro-moved. Accordingly, the biprism 5 is moved in the direction orthogonal to both the optical axis 13 and the wavefront splitting boundary of the biprism 5, i.e., in the upward or downward direction in the figure. For example, when the biprism 5 is micro-moved upwardly, the object wave 12 passes through the thicker portion of glass of the biprism 5, and hence it is delayed in phase. Whereas, the reference wave 14 passes through the thinner portion, and hence it is advanced in phase. FIG. 2 shows the manner in which the object wave and the reference wave interfere with each other in this case.

The laser light indicated by an arrow A is the object wave 12 transmitted through the sample 10. Each of the wavefronts $12_1, 12_2, \ldots$ has an uneven shape in accordance with the distribution of refractive index in the sample 10. On the other hand, the laser light indicated by an arrow B is a reference plane wave, and the wavefronts are indicated by a line group $13_1, 13_2, \ldots$ in the figure. When the laser light A and the laser light B tilted to the left and right, respectively, each at an angle of θ from the optical axis 13 interfere with each other, they reinforce each other at the region where the left and right wavefronts cross each other, resulting in a higher intensity. Whereas, they cancel each other at the region where the left and right wavefronts are superimposed in such a manner as to be shifted from each other by a half distance, resulting in a lower intensity. As a result, there occur interference fringes with the intensity distribution as indicated by a solid curved line 22.

At the regions where there is not present the sample 10 as in the opposite left and right edges of FIG. 2, there is the relationship expressed by the following equation (2) between the distance d between interference fringes, and the wavelength λ and the tilt θ of the laser light, and the relationship can be expressed as the equation (3) because the θ is generally very small.

$$2d \sin \theta = \lambda \qquad (2)$$

$$d = \frac{\lambda}{2\theta} \qquad (3)$$

Such interference fringes are determined by the interference system, and hence referred to as basic interference fringes or carrier interference fringes. On the other hand, the interference fringes in the region where the light rays have transmitted through the sample are not in straight lines, and locally shifted in distance and direction from the basic interference fringes in accordance with the phase changes.

Herein, a consideration will be given to the case where the laser light B of the reference wave 13 has been slightly advanced in phase. The wavefronts have moved to the positions respectively indicated by broken lines $13_1'$, $13_2'$, ... and each of the wavefronts crosses the different portion of the object wave 12. Accordingly, the resulting interference fringes are shifted as indicated by a broken curved line 22'. The movement of the interference fringes is determined by the relative positional relationship between the object wave 12 and the reference wave 13, regardless of whether the object wave 12, or both the object wave 12 and the reference wave 13 are advanced or delayed in phase. Even when the object wave 12 is advanced or delayed in phase, the tilt of the beam due to the biprism 5 is constant, so that the image of the sample does not move.

Thus, every time an interference image wherein the basic interference fringes have been shifted by 1/M (M: a positive integer of 3 or more) of the distance d is formed, the resulting interference image is captured into the calculating device 50 via the image pickup element 20 and the image capture board 51. A group of M interference images thus captured are sequentially arranged, indicating that the intensity of the laser light at a given one point in each of the images changes in accordance with the sine curve. FIG. 3 schematically shows this state for M=3, i.e., for three interference images $M_1$, $M_2$, and $M_3$. The amount of phase change is plotted on the abscissa, and the luminance of the laser light is plotted on the ordinate, thus showing the relationship with respective interference images. The reason for limiting the value of M to 3 or more is that data of 3 points at minimum is required for determining the sine curve on one point. The brightness of one point in the first interference image may start from the peak, or halfway in the valley according to the position. The phase value measured from the origin point of the sine curve determined for the point corresponds to the phase value of the laser light transmitted through the point. Therefore, if this value is determined for each point in the interference images, it is possible to determine the phase distribution due to the sample.

Such a way to determine the phase distribution can be mathematically expressed as the following equation (4), slightly different in description from the foregoing equation (1) due to the presence of the basic interference fringes:

$$\left\{\frac{2\pi x}{d} + \phi(x, y)\right\} = \tan^{-1}\left[\frac{\sum_{m=1}^{M} I(x, y; m)\sin\left(\frac{2\pi m}{M}\right)}{\sum_{m=1}^{M} I(x, y; m)\cos\left(\frac{2\pi m}{M}\right)}\right] \qquad (4)$$

where d denotes the distance between the basic interference fringes, of which the direction is matched to the direction of y axis. The first term of the left side is the linear tilt resulting from the interference of two tilted beams. Therefore, it is the already known amount, and hence it is easy to remove by calculation. Incidentally, the measurement not using the fringe scanning method is also possible. In such a case, one interference image may be captured into the calculating device 50 via the image pickup element 20 and the image capture board 51, and calculated by the foregoing Fourier transform method.

The phase distribution due to the sample determined by the transmission type microscope is the refractive index distribution for the laser interference system, and the sample thickness distribution, the internal potential distribution (corresponding to the refractive index distribution), and the distribution of electromagnetic field inside and outside the sample for the electron beam interference system.

FIG. 4 shows a fringe scanning electron beam interference device. Only an exposure optical system, a sample to be measured, and an electron beam biprism are shown for simplification. A vacuum container system including therein these components, a magnifying lens system, a power source system, and the like are not shown. Further, devices necessary for the measurement such as an image pickup element and a calculating device are the same as those in the laser interference measuring device, and hence they are omitted.

A reference numeral 71 denotes an electron beam source, and a reference numeral 72 is an electron beam emitted therefrom. The electron beam 72 emitted from the electron beam source 71 is converted to a nearly parallel beam through an exposure lens (exposure lens system) 73, and irradiated to a sample 74. The wavefront of the electron beam 72 is indicated by a solid line. The wavefront of the electron beam 72 is changed in phase due to the distribution of thickness of the sample 74 and the distribution of electromagnetic field inside and outside the sample upon passing through the sample 74, resulting in an uneven wavefront. The wavefront splitting element for electron interference is generally only an electron beam biprism. The electron beam biprism is made up of oppositely disposed electrodes 75 and 76, and a thin electrode 77 at the midpoint therebetween. The thin electrode 77 has a function of drawing electron beams passing through its opposite sides, and superimposing the beams in the region therebeneath by the application with a voltage of about +100 V. Therefore, if the sample is placed in either half of the electron beam path, the interference image of the sample-transmitted wave and the reference wave is formed on an observing plane 78. If the electron beam biprism is moved slightly rightward as indicated by an arrow, the difference in progressing speed is caused between the wavefronts of the object wave and the reference wave as indicated by broken lines in the figure. As a result, the fringes in the interference image are moved. However, even if the electron beam biprism is moved, the image of the sample is not moved because the tilt angle is constant. Therefore, the electron beam interference measurement can also be carried out in the same manner as with the laser interference. The phase distribution changed due to the sample can be measured by using the fringe scanning method, or the Fourier transform method when the electron beam biprism is not moved. Incidentally, for the movement of the electron beam biprism, a piezo element, a stepping motor, or the like is used as with the laser interference measuring device, but it is not shown.

SUMMARY OF THE INVENTION

With any of the foregoing interference measuring methods, the errors due to the interferometer itself are superimposed on the measurement results. With these interferometries, the shift between the phase of the beam transmitted through, or reflected by a sample to be measured and the phase of a reference beam is measured. The factors responsible therefor in a laser interference system are the distortion of laser wavefront due to fluctuations of a laser light source, ununiformity of thickness distribution of a semitransparent mirror, unevenness of the reflecting mirror surface or the semitransparent mirror surface, and the like, fluctuations of air, inaccuracy of thickness distribution of a biprism. The factors common to the laser interference system and an electron beam interference system are the distortion of a lens generated during manufacturing thereof, and Fresnel diffracted waves generated from the wavefront splitting boundary of the biprism. The phase changes caused by the foregoing factors are superimposed on the phase changes due to the sample, to be originally measured. Out of these factors, the influence of the Fresnel diffracted waves is the largest.

In the field of laser interference measurement, a reflection type interference system of roughly equivalent magnification is most often employed. A transmission type interference system of roughly equivalent magnification and a reflection type microscope are less often employed. Whereas, a transmission type microscope is employed very rarely. All of these are of an amplitude splitting type. There is no description on the interference system of a wavefront splitting type in literatures. With the amplitude splitting type interference system, there is not included a component for generating Fresnel diffracted waves as the wavefront splitting boundary, and it is possible to set each surface accuracy of the reflecting mirror and the semitransparent mirror at one-several tenth the wavelength. Accordingly, the measurement error inherent in the interference system is essentially small. Therefore, by using optical components having very high surface accuracy or thickness accuracy, the measurement error inherent in the interference system is corrected based on the phase distribution in the case where there is no sample for the transmission-type interference system, or the very high precision reference surface serving as a reference for the reflection type interferometer.

When the interference system of a transmission type microscope is configured, luminous fluxes split into two beams are required to include their respective magnifying lens systems, or to be received by the same magnifying lens system. As a result, for the amplitude splitting type, the optical system is increased in size, and becomes complicated. In contrast, for the wavefront splitting type, two luminous fluxes are situated at a short distance from each other, and hence readily received by the same magnifying lens system. Therefore, the wavefront splitting mode is overwhelmingly advantageous in terms of the setting space and the magnifying lens system. Particularly, for electron interference, the interference element is only a wavefront splitting type electron beam biprism in terms of practicality.

However, with the wavefront splitting type interference element, the Fresnel diffracted waves from the wavefront splitting boundary very largely affects the measurement. With the wavefront splitting type interference system, a beam is irradiated to the wavefront splitting element. The wavefront splitting boundary is the portion where the direction of refraction sharply changes for the laser interference system. Whereas, for the electron beam interference system, it is made up of a substance opaque (or having a transmittance largely different from that of the vacuum portion) to an electron beam. Therefore, Fresnel diffracted waves are generated from this portion, and superimposed onto the measurement region on the observing plane.

FIG. 5 schematically shows an example in which the phase changes due to the Fresnel diffracted waves generated from the wavefront splitting boundary are generated by taking the biprism 5 of the wavefront splitting type fringe scanning laser interference measuring device of FIG. 1 as an example. For simplification, the wavefront of an object wave 12 is indicated by a broken line, and the wavefront 16 of Fresnel diffracted wave on the object wave side is indicated by a solid line. The changes in phase due to an object are not shown. The laser light to be irradiated onto a sample 10 is generally a plane wave, and hence expressed as a plane group as with the object wave 12. Only the sample-transmitted portion undergoes a change into uneven form, and the plane group which has undergone the change into uneven form passes through an objective lens 4, thereby to be converged to the objective lens focal point. It further becomes a spherical wave diverging therefrom, and passes through the biprism 5, which is a wavefront splitting element, thereby to be tilted. At this step, Fresnel diffraction occurs due to a crest 51 on the optical axis of the biprism 5, so that wave in cylindrical plane from this point as a starting point reaches the observing plane. The same occurs also for the reference wave. As a result, three waves of the object wave, reference wave, and Fresnel diffracted wave interfere to one another on the observing plane. The Fresnel diffracted wave is divided into the Fresnel diffracted wave on the object wave side and the Fresnel diffracted wave on the reference wave side according to the shape and configuration of the wavefront splitting element 5, so that there occurs an interference of the resulting four waves. Therefore, the phase changes not due to the sample are added to the measured results, and hence they cannot be discriminated from the phase changes due to the sample.

Particularly, if the fringe scanning method which should be capable of higher-precision measurement is applied to the wavefront splitting type interference system, shifting in the relative positional relationship between the sample image and the interference fringes is moving of the Fresnel diffracted wave because the interference fringes and the Fresnel diffracted wave are integral and inseparable. Accordingly, the measurement precision is unfavorably not improved as expected in principle. As shown in FIG. 5, the Fresnel diffracted wave generated from the crest 51 at the center of the biprism 5 moves in conjunction with the movement of the biprism 5. Therefore, the changes in brightness at a given point P in the sample image are affected by both the phase changes due to the sample and the phase changes due to the Fresnel diffracted wave. This phenomenon invariably occurs irrespective of the foregoing method for changing the relative positional relationship between the sample image and the interference fringes. Namely, the phase changes due to the optical system become involved in determining a sine curve, which causes the restriction on the measurement precision.

This problem is also true for the interference measurement using an electron beam. The thin electrode 77 of the electron beam biprism described by reference to FIG. 4 is a substance opaque (or having a transmittance largely different from that of the vacuum portion) to an electron beam. Therefore, Fresnel diffracted waves are generated therefrom. The influence of this phenomenon upon the measurement results is the same as described in the section on the laser interference.

Also with this method, by determining the difference in phase distribution due to the presence or absence of the sample with precision, it is possible to reduce the influence of the Fresnel diffracted wave to a certain degree. However, the Fresnel diffracted wave itself undergoes a phase change in the inside of the sample or in the region where large phase changes occur. Therefore, it is not possible to perform the correction with the difference in phase distribution due to the presence or absence of the sample. Further, in actuality, a slight shift in the positional relationship between the optical axis and a lens axis or the wavefront splitting element causes the shift of the phase distribution due to the Fresnel diffracted wave on the observing plane. Therefore, it is not easy to obtain the measurement data for the cases where there is the sample and there is no sample, under precisely identical conditions for a very short time. Accordingly, sufficient effects of correction often cannot be obtained.

Further, in electron interference, in many cases, the sample has an electric field or a magnetic field, or a very small amount of charges are accumulated in the sample. In such a case, the orbit of the electron beam changes according to the presence or absence of the sample, so that the error inherent in the interference system also changes. Therefore, correction is rather counterproductive.

With the amplitude splitting type interference system, the slight shift in the positional relationship between the optical axis, and the lens axis or the interference system is the shift of the region to be used by the lens or the interferometer. In general, the difference therebetween is sufficiently small. Further, for the laser interference system, the amount to be measured is the distribution of refractive index for the laser light. Accordingly, the measurement results are not affected at all even in the case where an electric field or a magnetic field is distributed around the sample. For such a reason, as distinct from the wavefront splitting type interference system, it is relatively easy to correct the measurement errors inherent with the interference system with the measurement results for the case where there is no sample, and to achieve high measurement precision without a large deficiency. However, with the wavefront splitting element, which is essentially very advantageous for a microscope, Fresnel diffracted waves are inevitable in principle.

The foregoing problem become a large obstacle especially when a wavefront splitting type interference system advantageous for a transmission type microscope is configured. However, this has been scarcely recognized because there are very few examples of both the interferometer using a wavefront splitting element and the transmission type interference measuring device. Whereas, the interference measurement using an electron beam has only been performed very limitedly. The fact that the Fresnel diffracted waves due to the electron beam biprism adversely affects the measurement has not been widely recognized. Hitherto, there has been known only the method for performing correction with the measurement results for the case where there is no sample.

In order to obtain precise measurement results in interference measurement using a coherent beam (such as a laser light or an electron beam), the measurement errors due to the interference system is required to be removed. Particularly, with the wavefront splitting type interference system, Fresnel diffracted waves are generated from the wavefront splitting boundary of the wavefront splitting element as described above, which largely and adversely affects the measurement precision.

The present invention has been completed for removing the influence of the Fresnel diffracted waves. Particularly, large effects are produced for the wavefront splitting type interference microscope and an electron interference microscope. The following second means is capable of being applied also to a general amplitude splitting type or reflection type interference measuring device.

A first means for avoiding the problem is to prevent the generation of Fresnel fringes from the wavefront splitting boundary. The wavefront splitting boundary is absolutely necessary. If there is the boundary, Fresnel diffraction invariably occurs. Therefore, to prevent the beam from being applied onto the boundary is the essential solving method. Fresnel diffraction invariably occurs if there is some object, or if a wave undergoes a sharp change. The Fresnel diffracted waves are converged into one point in the generation position or the optically equivalent position. The wavefront splitting element is required to be set at a different position from the sample plane and the observing plane, or the plane equivalent thereto in principle. Therefore, with this, Fresnel diffracted waves are invariably superposed on the observing plane.

Thus, if a shielding plate is placed on the plane equivalent to the observing plane, to be formed between the laser light source and the biprism, so that the wavefront splitting boundary of the wavefront splitting element lies within the shadow thereof, it is possible to avoid Fresnel diffracted waves by the shielding plate, and to implement the situation where Fresnel diffraction will not occur at the wavefront splitting element.

In general, the measurement is carried out under the condition where a focus is achieved on a sample. Therefore, in this case, the shielding plate is placed on the sample plane, or the plane equivalent to the sample plane, to be formed between the coherent beam source and the wavefront splitting element. In this step, the shielding plate is not required to be exactly on the observing plane, or the plane equivalent to the sample plane. Fresnel diffracted waves converge to one point at the source, and hence there occurs very little spreading of Fresnel diffracted waves in the very nearby region thereof. Therefore, the Fresnel diffracted waves due to the edges of the shielding plate is allowable so long as they do not affect the portion to be measured which has undergone phase changes due to the sample on the observing plane.

A second means for removing the phase changes due to the interference system is the following method. Namely, two measurement results for the case where there is a sample are obtained by shifting the positional relationship between the sample image and the interference fringes. The difference between the two results is integrated with respect to the direction of shift, thereby to obtain the measurement result from which the errors inherent in the interference system has been removed. Particularly, this method is combined with the method referred to as a fringe scanning method wherein the phase change distribution due to the sample is measured with high precision from a plurality of interference images having gradually and successively shifted relative positional relationships between the sample image and the interference fringes with respect to each other. As a result, it is possible to obtain high-precision correction effects with ease because the foregoing two types of measurement results can be obtained from a series of interference image groups.

DETAILED DESCRIPTION OF THE PREFERRED EMBODIMENTS

Embodiment 1

Figure 1:
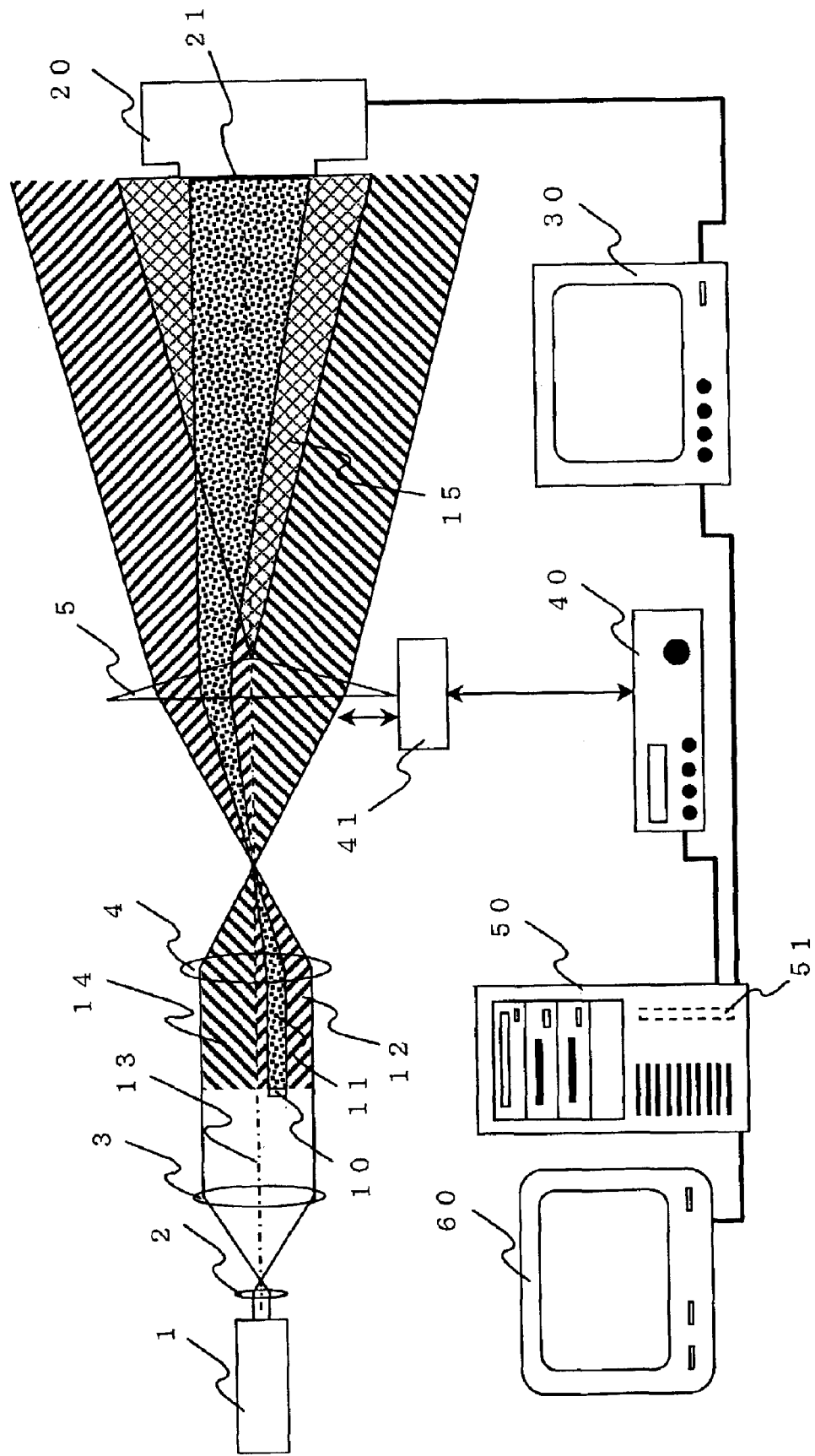
FIG. 1 is a diagram showing an example of a configuration of a wavefront splitting type fringe scanning laser interference measuring device.
Figure 2:
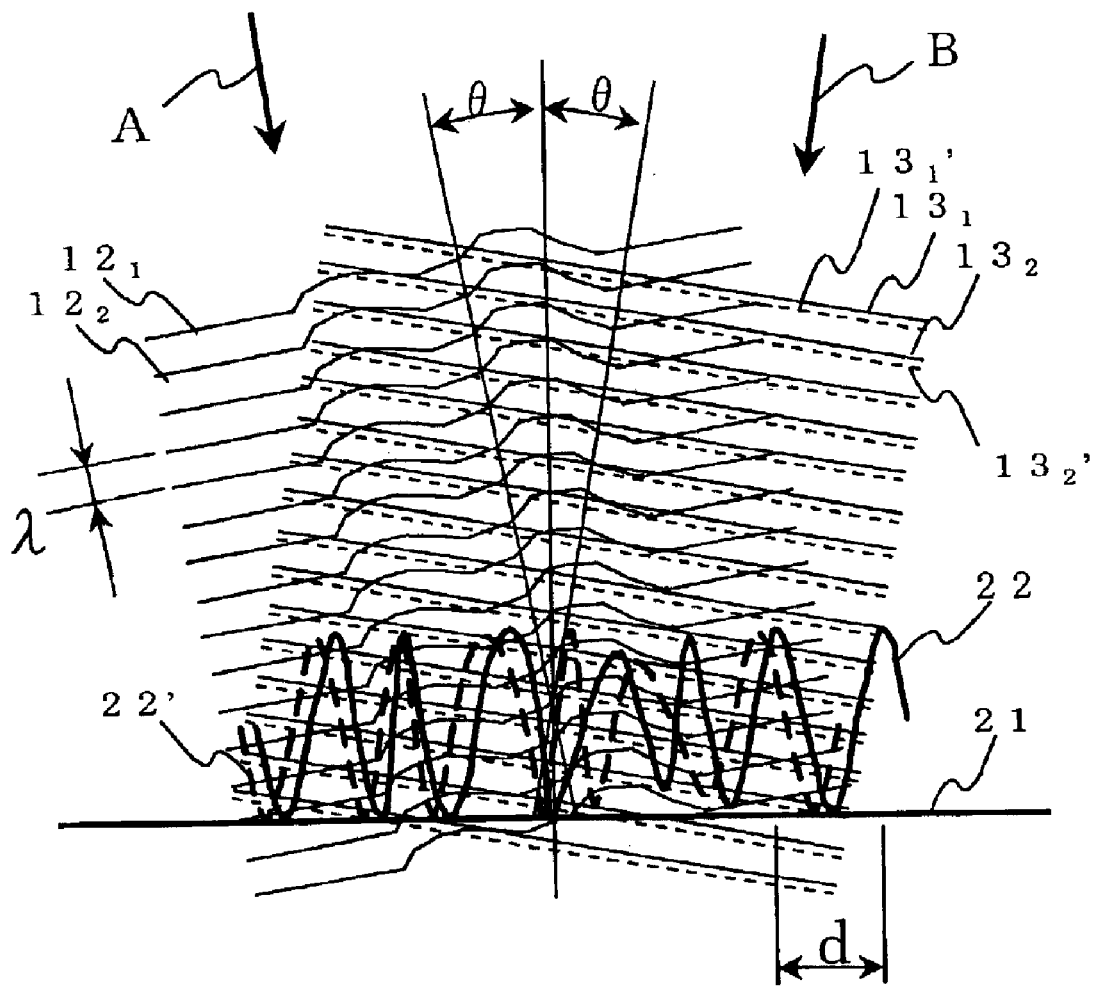
FIG. 2 is a diagram schematically showing the manner in which interference fringes are formed and shifted.
Figure 3:
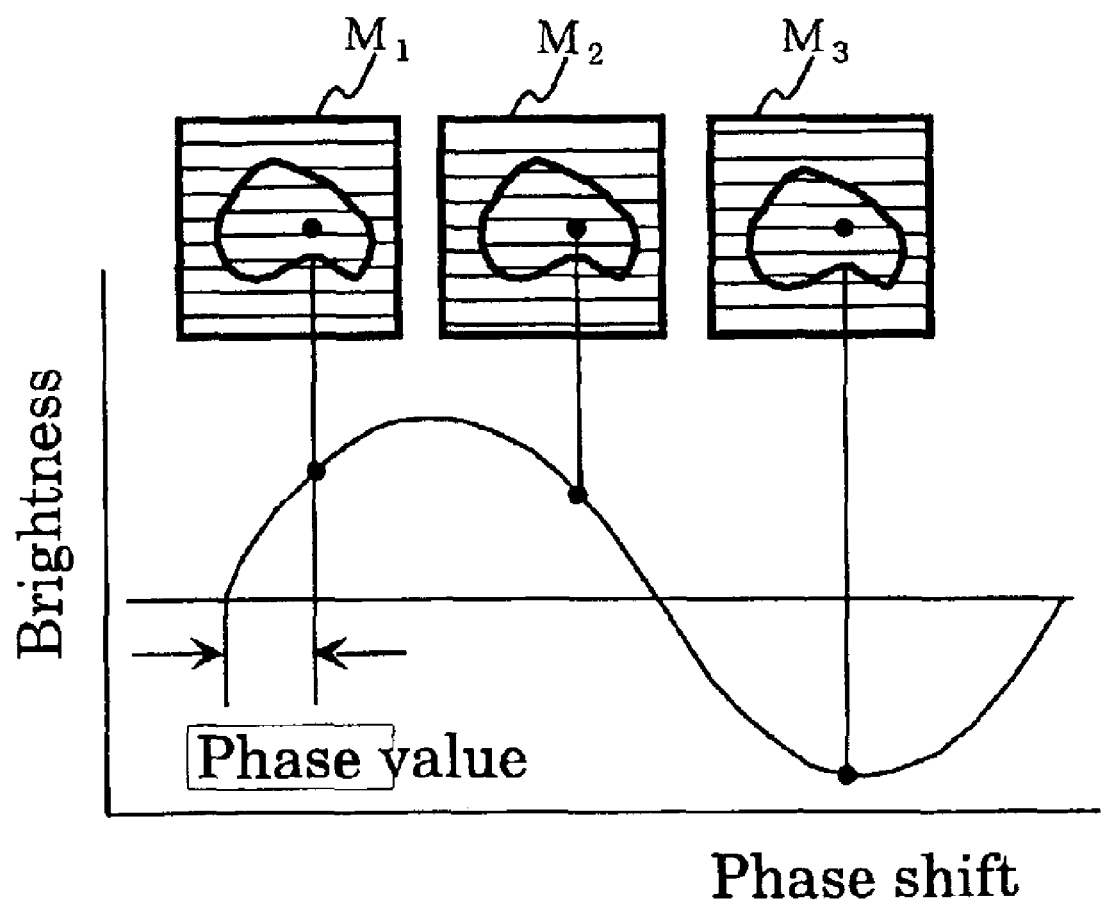
FIG. 3 is a diagram schematically showing the fact that the brightness of a given point P in interference images in which only the interference fringes have been successively shifted in the laser interference measuring system, changes in accordance with a sine curve.

A first embodiment of the present invention will be described by reference to a fringe scanning laser interference measuring device based on the movement of a biprism shown in FIG. 6. In this embodiment, a biprism 5 which is a wavefront splitting element was used as an interference element, and a beam shielding plate 100 in such a form as to act as a shield against a beam to be irradiated to the wavefront splitting boundary of the biprism was disposed on the sample plane as a means for removing the phase change distribution due to the interference element. The phase distribution of a sample image or a sample-transmitted beam is generally observed at the positive focal point. Herein, the shielding plate 100 was therefore placed on the sample plane equivalent to an observing plane, so that the positive focal point image of a sample was formed directly on the image pickup surface of an image pickup element 20. Herein, there was employed a one-stage magnifying system in which one lens was used between a sample 10 and the wavefront splitting element 5. However, both a two- or more-stage magnifying system and an optical system for further magnifying the interference image are also acceptable. When there is placed a two-, or more-stage magnifying system before the wavefront splitting element, an intermediate magnified image is positioned on a plane equivalent to the observing plane. Accordingly, the shielding plate 100 may also be placed thereon. With this arrangement, the shielding plate 100 may be enlarged, so that the requirement for the position accuracy with respect to the shielding plate is also loosened. Thus, this process is desirable for a microscope. Whereas, the shielding plate 100 may also be placed on a plane equivalent to an observing plane 21 to be formed between a laser light source 1 and a collimator lens 3, although this arrangement is disadvantageous for being applied to a microscope.

Figure 6:
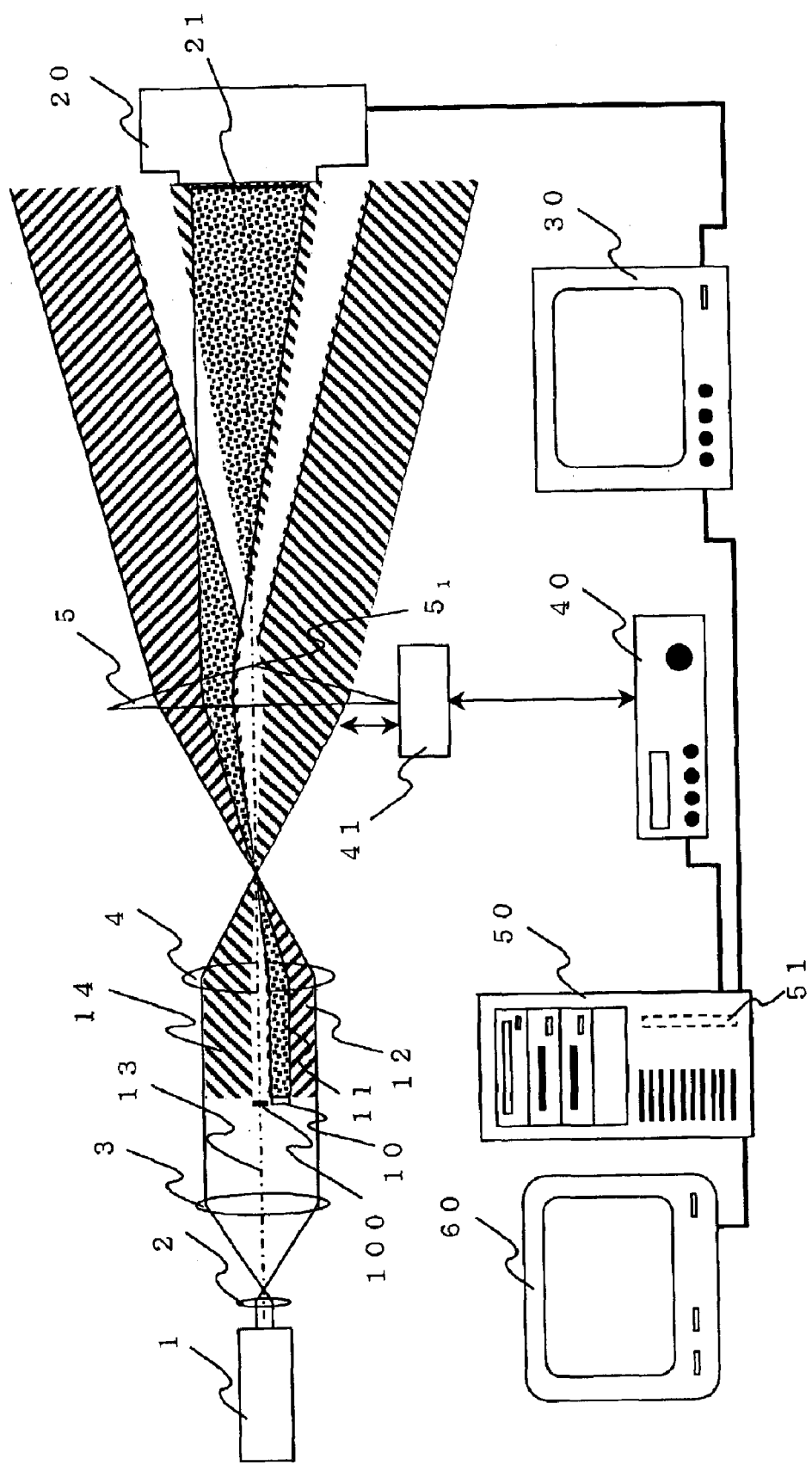
FIG. 6 is a diagram showing an example of a configuration of a fringe scanning laser interference measuring device based on the movement of a biprism, for illustrating an embodiment using a shielding plate which is a first method of the present invention.

As indicated by the blank portion at the rear of the shielding plate 100 in FIG. 6, in accordance with this embodiment, the wavefront splitting boundary $5_1$ of the wavefront splitting element 5 causing the generation of Fresnel diffracted waves lies within the shadow of the shielding plate 100. Accordingly, it is possible to avoid Fresnel diffraction due to the wavefront splitting boundary $5_1$. In this case, Fresnel diffracted waves are generated by the end face position of the shielding plate. However, as previously described, the waves will not affect the portion changed in phase by the sample on the observing plane. The influences of Fresnel fringes generating from the wavefront splitting boundary becomes a more serious problem when a high-precision measurement is carried out. Therefore, in this embodiment, the measuring system using a fringe scanning method was shown. However, needless to say, even with a general interference measuring device which does not control the relative positional difference between an object wave and a reference wave, the effect of the beam shielding plate on the measurement precision improvement is large.

Embodiment II

Figure 7:
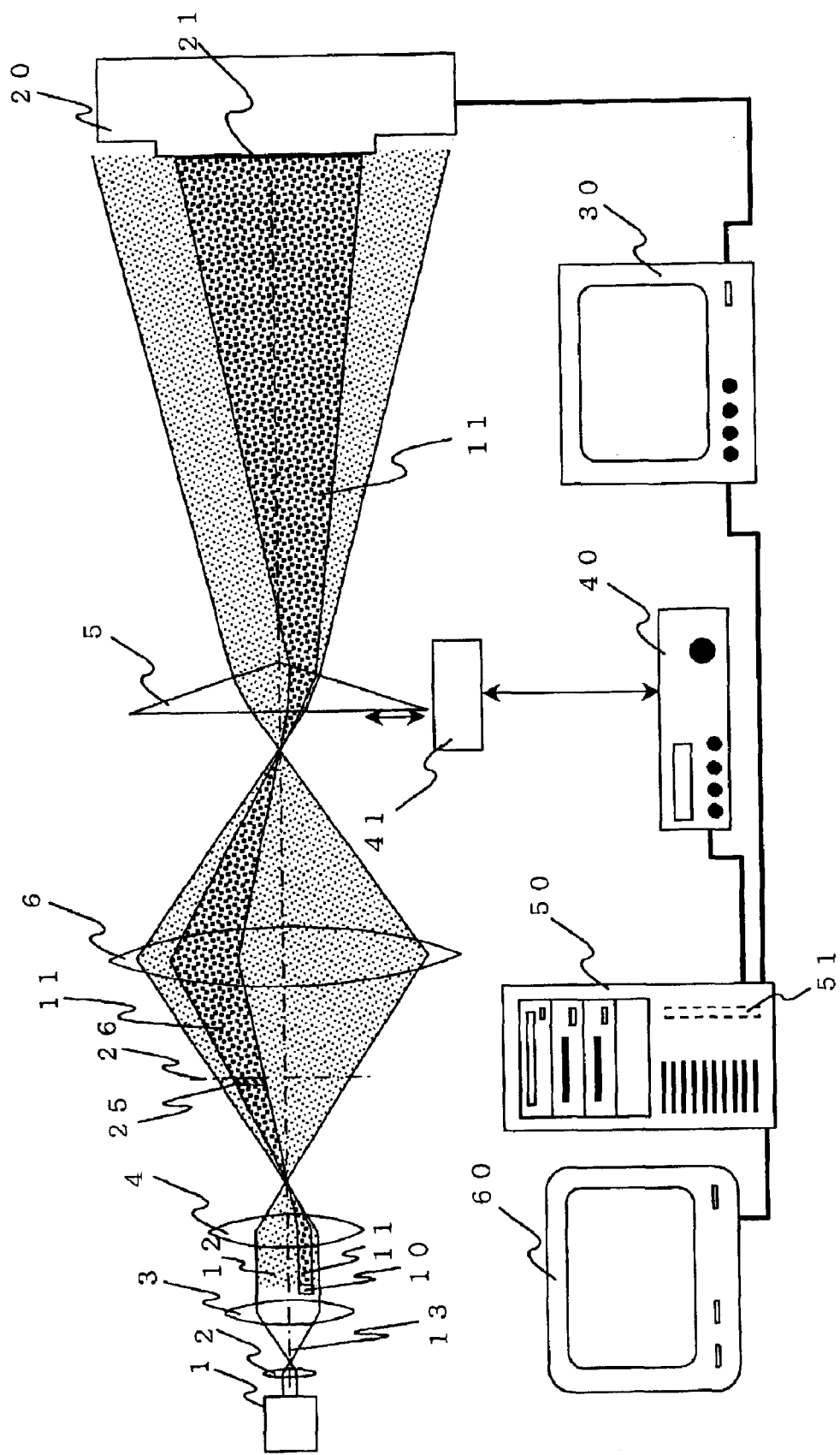
FIG. 7 is a diagram showing an example of a configuration of a two-stage magnification type fringe scanning laser interference measuring device based on the movement of a biprism, for illustrating another embodiment using a mechanism for shifting the positional relationship between a sample and the interference fringes, and calculation processing which is a second method of the present invention.

FIG. 7 shows a second embodiment of the present invention. This is so configured that the magnifying lens system of the fringe scanning interference measuring device shown in FIG. 1 has been changed to a two-stage system of an objective lens 4 and a magnifying lens 6 as far as the components shown in this figure concerned. Herein, a reference numeral 25 denotes an intermediate magnified image, and 26 denotes the position at which the intermediate magnified image is formed. A biprism 5, which is a wavefront splitting element, was used as an interference element. A biprism micro-movement mechanism 41 for shifting the relative positional relationship between a sample image and the interference fringes was disposed at an observing plane as a means for removing the phase change distribution due to the interference element. In addition, a calculating device 50 has functions of storing a first interference image, and a second interference image shifted from the first interference image in the relative positional relationship between the sample image and the interference fringes, and determining the phase distribution due to a sample to be measured by the interimage operation on a first phase distribution calculated from the first interference image and a second phase distribution calculated from the second interference image. Further, with the device configuration in accordance with the present invention, it is also possible to correct the phase change amount due to an interferometer when the fringe scanning method has been used.

First, the most basic operation not using the fringe scanning method is as follow. The first interference image is formed with a sample 10 being set, and one image thereof is inputted and stored in the calculating device 50 via an image pickup element 20. As described above, this is mathematically Fourier transformed, and either of a + primary or a − primary spectrum is selected with an appropriate window, and Fourier inverse transformed to correct the tilt amount. Thus, the first phase distribution is determined. The determined first phase distribution is the sum of both the following terms, and thus expressed as the following expression (5):

$$\phi(x,y)+\varphi(x,y) \quad (5)$$

where $\phi(x,y)$ denotes the distribution of phase change due to the sample, and $\varphi(x,y)$ denotes the phase distribution due to the largest Fresnel diffracted wave, to only which a consideration is given for simplification.

However, at this point, as with conventional devices and methods, it is not possible to discriminate between both phase distributions.

Then, the biprism 5 is moved in the direction orthogonal to both the crest on the optical axis of the biprism and the optical axis, i.e., in the upward direction or the downward direction on the figure by means of a micro-movement control device 40 via a micro-movement control mechanism 41 so that the interference fringes move by $\Delta x$ on an observing plane 21. Thus, one image of the second interference image is captured in the calculating device 50. In this example, the micro-movement control device 40 is so configured as to be controlled by the calculating device 50. However, the micro-movement control device 40 may also be controlled manually. As a result of movement of the biprism 5, the shift in the relative positional relationship between the sample and the interference fringes is achieved. The phase distribution recorded in the second interference image is calculated by the same operation as that performed on the first interference image. The phase distribution herein reproduced is identical in phase change component due to the sample to the first phase change distribution. However, for the phase change component due to Fresnel diffracted waves (and the biprism 5), the interference fringes move by $\Delta x$ on the observing plane following the motion of the biprism 5. Therefore, the phase distribution determined from calculation is expressed as the following expression (6):

$$\phi(x,y)+\varphi(x+\Delta x,y) \quad (6)$$

Thus, the difference between the phase distribution calculated from the second interference image and the phase distribution calculated from the first interference image is determined, and the resulting value is normalized by the amount of movement $\Delta x$. The amount thus obtained is expressed as the following equation (7), which corresponds to the form of differentiation of the phase distribution due to Fresnel diffracted waves with respect to the x direction:

$$\frac{\{\phi(x,y)+\varphi(x+\Delta x,y)\}-\{\phi(x,y)+\varphi(x,y)\}}{\Delta x} = \frac{\varphi(x+\Delta x,y)-\varphi(x,y)}{\Delta x} \quad (7)$$

Thus, if this is integrated with respect to the direction of $\Delta x$, it is possible to determine the phase distribution due to Fresnel diffraction as shown in the following equation (8):

$$\varphi(x,y) = \int \frac{\varphi(x+\Delta x,y)-\varphi(x,y)}{\Delta x} dx \quad (8)$$

Thus, by determining the difference between the first phase distribution expressed by the expression (5) and the phase distribution expressed by the equation (8), it is possible to correct the errors due to the interference system. As a result, it is possible to extract only the phase change distribution $\phi(x,y)$ due to the sample.

Strictly, the second phase distribution has a magnitude of the phase value shifted from that of the first phase distribution by the difference in initial phase upon formation of the interference images. This is, however, achieved by shifting the contour of the phase distribution in the direction of a phase axis as it is. Therefore, even if this is translated in the direction of the phase axis, so that the levels of the first and second phase distributions are in agreement with each other, the results are not affected thereby at all. Further, this amount is $2\pi\times$(amount shift of interference fringes $\Delta x$)/(distance between interference fringes d). Therefore, it is also easy to correct the level.

Figure 8A:
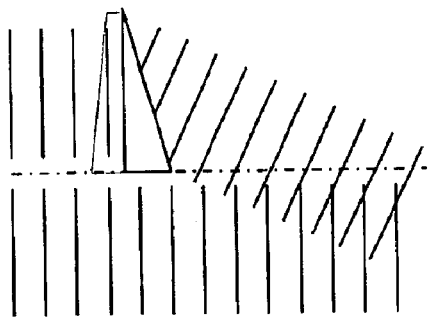
FIGS. 8A to 8D are diagrams respectively showing the examples of the prism shape applicable to the present invention, and the wavefronts respectively resulting therefrom.
Figure 8B:
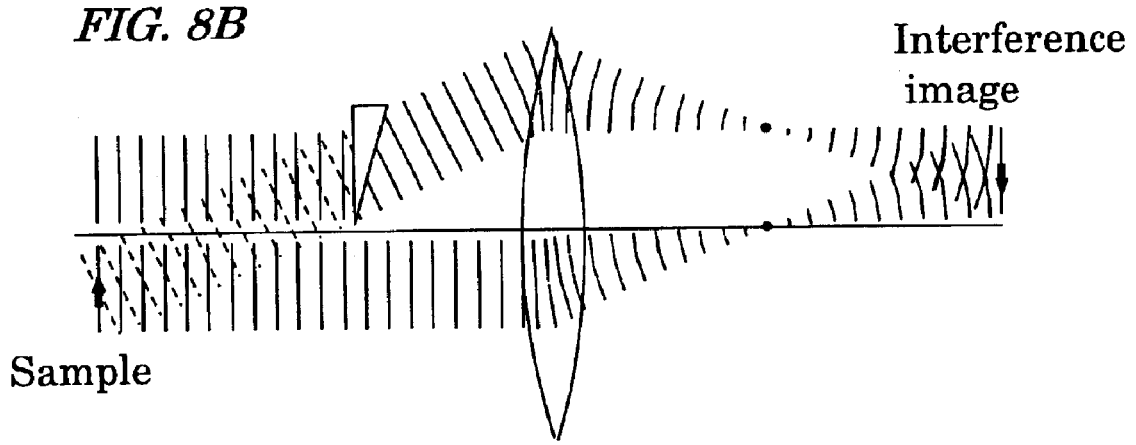
Figure 8C:
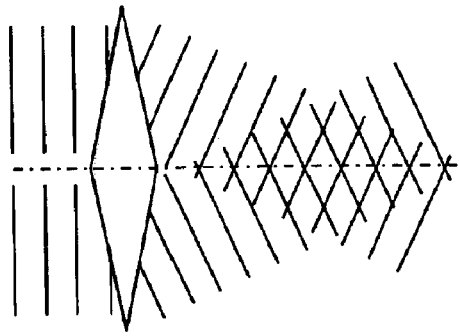
Figure 8D:
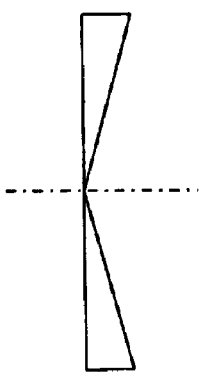

In the laser interference system, prisms in various shapes may be adopted. FIGS. 8A to 8D show prisms in some shapes, to which the present invention can be applied, other than that in the foregoing embodiment, and the respective wavefronts caused thereby. In any case, the wavefront splitting boundary lies on the optical axis indicated by each dashed line. FIG. 8A shows a general triangular prism; FIG. 8B, an example in which a triangular prism set in such a direction that a beam diverges is used together with a condensing lens; and FIGS. 8C and 8D, a combination of prisms each triangular in cross section with the wavefront splitting boundary as the interface. FIG. 8D shows only the element shape because the prism is used in the same manner as that of FIG. 8B.

The case where the fringe scanning method is applied in the embodiment shown in FIG. 7 is as follows.

While moving the biprism 5 so that the amount of movement of the interference fringes with respect to the sample image is $1/M$ (M is a positive integer of larger than 3) of the distance between the interference fringes on the observing plane 21, a first interference image group made up of M images are inputted to the calculating device 50. Then, while moving the biprism 5 in the same manner as described above so that the amount of movement of the interference fringes is $1/N$ (N is a positive integer of more than 3) of the distance between the interference fringes from the state where the interference fringes have been shifted by $\Delta x$ from the first interference image of the first interference image group, a second interference image group made up of N images are inputted to the calculating device 50. At this step, M and N are not required to be identical with each other. The first phase distribution can be calculated from the following equation (9) on each point (x, y):

$$\frac{2\pi x}{d} + \phi'(x,y) = \tan^{-1}\left[\frac{\sum_{m=1}^{M} I(x,y;m)\sin\left(\frac{2\pi m}{M}\right)}{\sum_{m=1}^{M} I(x,y;m)\cos\left(\frac{2\pi m}{M}\right)}\right] \quad (9)$$

where the first term of the left side is the phase resulting from the interference of two tilted beams, and d denotes the distance between the interference fringes; and the right side I(x,y;m) denotes the brightness at point (x, y) in the m-th interference image in M images.

The phase distribution $\phi(x,y)$ obtained by correcting the phase distribution of tilt is the same as the phase distribution of the expression (5) determined in the foregoing manner, and expressed as the following equation (10):

$$\phi'(x,y)=\phi(x,y)+\varphi(x,y) \quad (10)$$

Further, the second phase distribution determined similarly from the second interference image group can be calculated from the following equation (11) given by replacing M and m in the equation (9) with N and n, respectively:

$$\frac{2\pi(x+\Delta x)}{d}+\phi'(x+\Delta x,y)=\tan^{-1}\left[\frac{\sum_{n=1}^{N}I(x,y;n)\sin\left(\frac{2\pi n}{N}\right)}{\sum_{n=1}^{N}I(x,y;n)\cos\left(\frac{2\pi n}{N}\right)}\right] \quad (11)$$

As with the correction of the phase distribution of tilt with respect to the first interference image group, the phase distribution $\phi'(x+\Delta x,y)$ obtained by correcting the phase distribution of tilt with respect to the second interference image group is expressed as the following equation (12):

$$\phi'(x+\Delta x,y)=\phi(x,y)+\phi(x+\Delta x,y) \quad (12)$$

If the first phase distribution represented by the equation (10) is subtracted from the second phase distribution represented by the equation (12), and the resultant value is divided by $\Delta x$, as with the equation (7), it is possible to obtain the differential of the phase change distribution due to the interference system as expressed by the following equation (13):

$$\frac{\{\phi(x,y)+\varphi(x+\Delta x,y)\}-\{\phi(x,y)+\varphi(x,y)\}}{\Delta x}=\frac{\varphi(x+\Delta x,y)-\varphi(x,y)}{\Delta x} \quad (13)$$

Therefore, as with the foregoing equation (8), if this is integrated with respect to the x direction, it is possible to determine the phase change distribution $\phi(x,y)$ due to the interference system, in this example, the phase changes due to the Fresnel diffracted waves generated from the biprism. If this is subtracted from the value of the equation (10), it is possible to determine the phase change distribution due to the sample. In this example, the laser interference system was employed. However, the device configuration is precisely the same even for the electron beam interference system shown in FIG. 4, so that it is possible to implement the correction method only by the calculation processing.

Embodiment III

On the other hand, the second phase distribution of the expression (6) is shifted by $-\Delta x$ in the calculating device, and subtracted from the first phase distribution of the expression (5). The resultant value is then normalized by $\Delta x$. As a result, it is also possible to directly obtain the form given by differentiating the phase change distribution due to the sample as expressed as the following expression (14):

$$\frac{\phi(x,y)-\phi(x-\Delta x,y)}{\Delta x} \quad (14)$$

Figure 9:
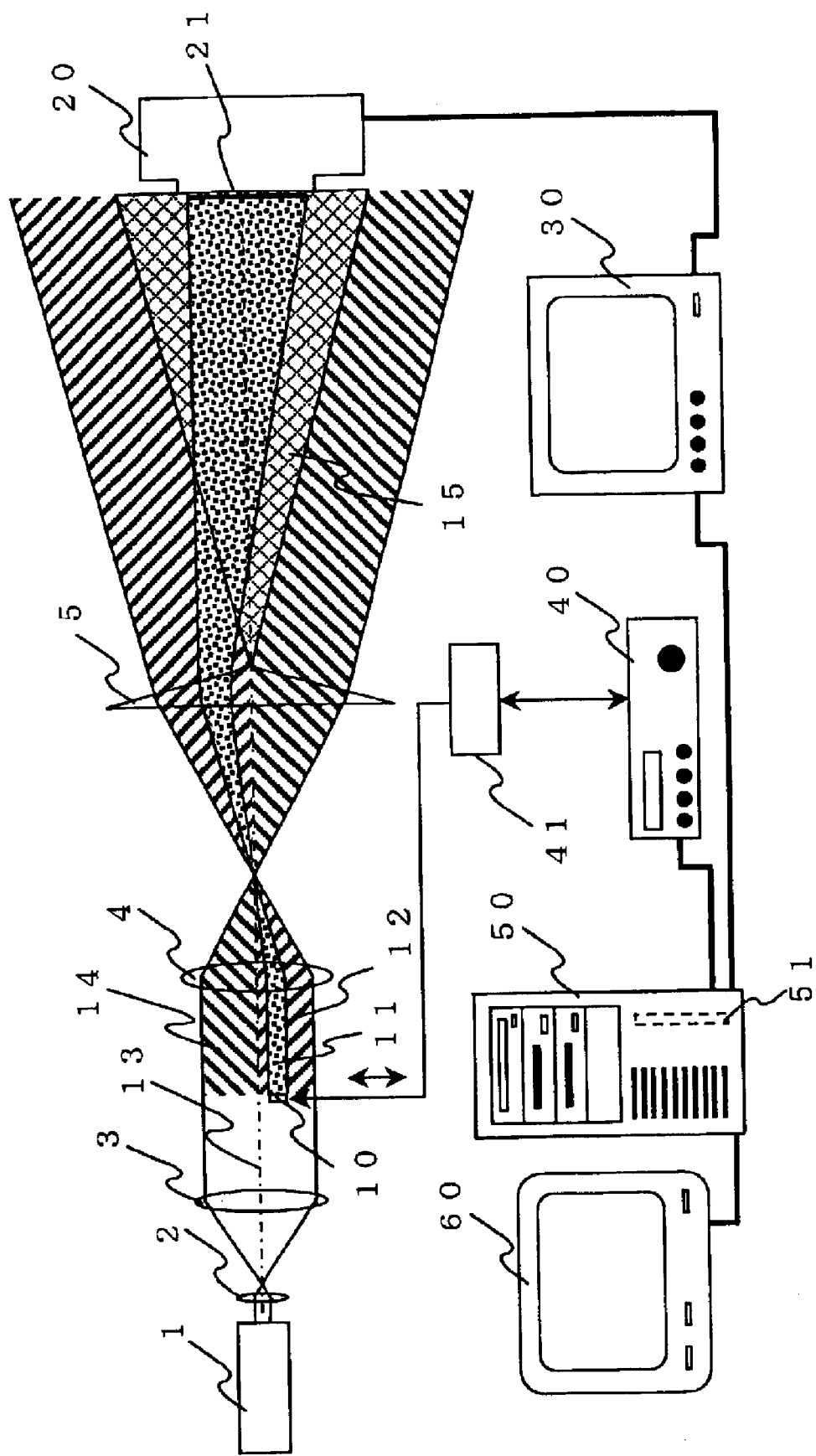
FIG. 9 is a diagram showing an example of a configuration of an embodiment for implementing a fringe scanning method by micro-moving a sample in place of the biprism.

This is basically equivalent to that for the case where the sample 10 has been moved by $-\Delta x$ in place of moving the biprism 5 of Embodiment 2 by $+\Delta x$ for forming the second interference image except for the opposite edges along the x direction of the image. Therefore, the sample 10 may also be moved. FIG. 9 shows an embodiment in which the fringe scanning interference method is implemented by micro-moving the sample 10. The configuration of FIG. 9 is different from the configuration of FIG. 6 only in that the micro-movement control mechanism 41 vertically moves the sample 10 with respect to the optical axis 13 in place of the biprism 5, for easy understanding by comparison with that of FIG. 6. A signal is sent to the micro-movement control device 40 in response to an instruction via a calculating device 50 from an observer, so that the sample 10 can be vertically moved with respect to the optical axis 13. Also in this embodiment, it is possible to similarly perform the correction calculation of the device configuration and interference system errors even by a method based on the operation processing using Fourier transformation in place of the fringe scanning method.

First, an interference image is formed. While moving the sample 10 so that the amount of movement of the sample is 1/M (M: a positive integer of larger than 3) of the distance between the interference fringes on the observing plane 21, a first interference image group made up of M images are inputted to the calculating device 50. Then, while moving the sample 10 so that the amount of movement of the sample 10 is 1/N (N: a positive integer of more than 3) of the distance between the interference fringes from the state where the sample position has been shifted by $\Delta x$ from that in the first interference image of the first interference fringe group, a second interference image group made up of N images are inputted to the calculating device. As for the first phase distribution, the amount of shift of the sample in each interference image of the first interference image group is corrected in the opposite direction in the calculating device, thereby to accomplish the conversion to the interference image group in which each position of the sample is aligned with that in the first interference image of this group. Thus, the calculation is performed based on the equation (9). Also for the second phase distribution, similarly, each position of the sample in the second interference image group is corrected so as to be identical with that in the first interference image of this group. Thus, the calculation is performed based on the equation (11). As a result, both are respectively as represented by the following expressions (15) and (16):

$$\phi(x,y)+\phi(x,y) \quad (15)$$

$$\phi(x+\Delta x,y)+\phi(x,y) \quad (16)$$

Therefore, if the first phase distribution is subtracted from the second phase distribution, and the resultant value is normalized with $\Delta x$, it is possible to directly determine the differential of the phase distribution due to the sample 10 as expressed as the following expression (17). Accordingly, if integration is performed in the same manner as with the equation (8), as expressed by the equation (17), it is possible to determine the phase distribution due to the sample.

$$\frac{\phi(x+\Delta x,y)-\phi(x,y)}{\Delta x} \quad (17)$$

Embodiment IV

If this method is further developed, a more systematic measurement is implemented. Examples of the procedure include some methods as shown below.

A first method is a method in which an interference image group of M+1 images recorded while successively shifting the relative positional relationship between the sample image and the interference fringes by 1/M (M is an integer $\geq 3$) of the distance therebetween is captured in the calculating device 50. The phase distribution determined by calculation is determined as the values each indicating at which position each point is located with respect to the origin point of a sine curve for the first interference image of each series. Therefore, the first phase distribution calculated using the first to M-th images of the interference images and the second phase distribution calculated using the second to M+1-th images are shifted in phase change distribution due to the biprism from each other by 1/M of the distance between basic interference fringes along the direction orthogonal to the crest on the optical axis of the biprism. They are shifted from each other in absolute value of the phase value by $2\pi/M$. Accordingly, the phase change distribution due to the sample can be determined directly, or after removing the errors inherent in the interference system from the first and second phase distributions by the same method as described above.

A second method is a method as follows: an interference image group of M images recorded while successively shifting the relative positional relationship between the sample image and the interference fringes by 1/M (M is an even number of 6 or more) of the distance therebetween on the observing plane 21 is captured in the calculating device 50; and the first phase distribution calculated from the odd-numbered images of the interference image group and the second phase distribution calculated from the even-numbered images of the interference image group are used. The phase distributions calculated from their respective images are shifted from each other in phase change distribution due to the biprism by 1/M the distance. Accordingly, still similarly, it is possible to extract only the phase change distribution due to the sample.

A third method is implemented by extending the second method to a common case. First, as an example, an interference image group of 12 images recorded while successively shifting the interference fringes on the observing plane by $1/12$ of the distance therebetween are captured. Then, the captured images are classified into 3 sequences in groups of 4-image series of {Image (1), Image (4), Image (7), Image (10)}, {Image (2), Image (5), Image (8), Image (11)}, and {Image (3), Image (6), Image (9), Image (12)}. Herein, Image (m) denotes the m-th interference image. In the respective sequences, there are their corresponding interference image groups each made up of 4 images having interference fringes successively shifted by $3/12$ (=$1/4$) of the distance therebetween with respect to each other. Therefore, it is possible to calculate the phase distributions by the phase shift method in their respective series. The sequences are successively shifted from each other in initial phase by $1/12$ the distance. Therefore, if the difference between two phase distributions determined from given two sequences out of the three sequences is determined, it is possible to extract only the phase change distribution due to the sample in the same manner as described above.

For generalization, this can be expressed as follows. Namely, (K×M) interference images having interference fringes successively shifted by 1/(K×M) the distance with respect to each other are captured in the calculating device, where M denotes a positive integer of 3 or more, m is a variable (natural number) changing from 1 to M, K is a positive integer of 2 or more, and k is a variable (natural number) changing from 1 to K. Thus, there occur K sequences of interference image groups each made up of M images expressed as the following expression:

$$\Sigma I\{(m-1)K+k\} \tag{18}$$

where Image {(m−1)K+k} denotes the ((m−1)K+k)-th interference image.

It is possible to determine the phase distribution due to the sample from the first and second phase distributions respectively calculated from given two sequences out of the K sequences by any of the foregoing methods. For example, the Δx of the equation (4) is desirably smaller from the mathematical viewpoint. However, it is desirably larger to a certain degree in actual data form from the viewpoint of effects of a noise and the like. The optimum magnitude depends upon the experimental conditions. However, when the phase distribution is determined from given two sequences out of the K sequences, it is possible to set the Δx at 1/(K×M) of the distance between interference fringes for the sequences where k=1 and k=2. Whereas, it is possible to set it at 2/(K×M) of the distance between interference fringes for the sequences where k=1 and k=3. This results in an increase in degree of freedom for selection of Δx. Further, even if a few interference images inappropriate to be used as data due to the factors such as vibration and power source fluctuations are included in a sequence, substantial effects are avoidable by using other two sequences except for the sequence for the calculation. In addition, such data acquisition can be carried out as the acquisition of a series of interference images. Therefore, this process will not cause more trouble.

Incidentally, needless to say, in the foregoing three methods, any of the mode of moving the biprism, the mode of moving the sample, and the mode of tilting the beam to be irradiated to the sample shown in Embodiment 5 below can be used as the mode of shifting the relative positional relationship between the sample image and the interference fringes.

Embodiment V

Figure 4:
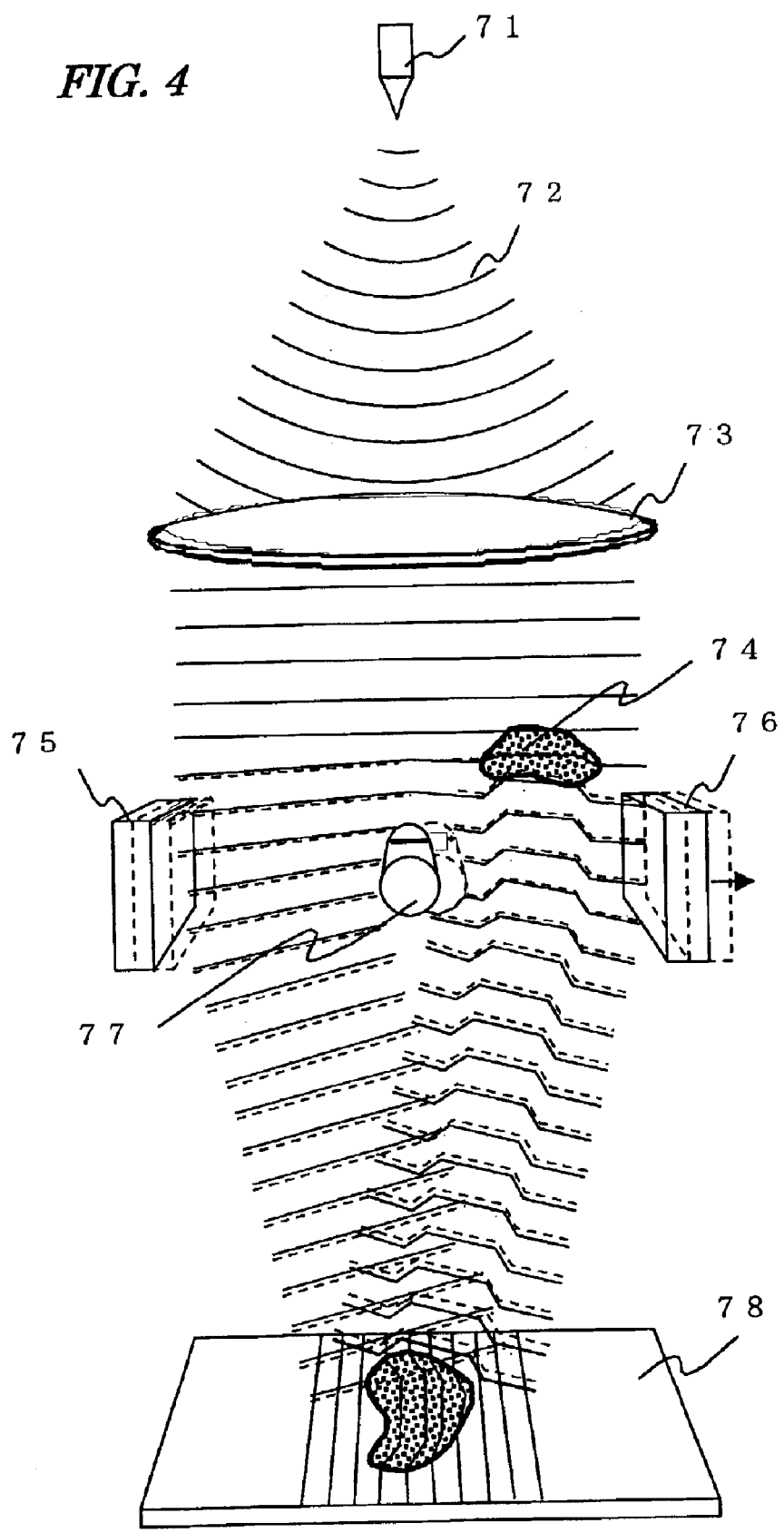
FIG. 4 is a diagram showing an electron beam interference device using a fringe scanning method.
Figure 5:
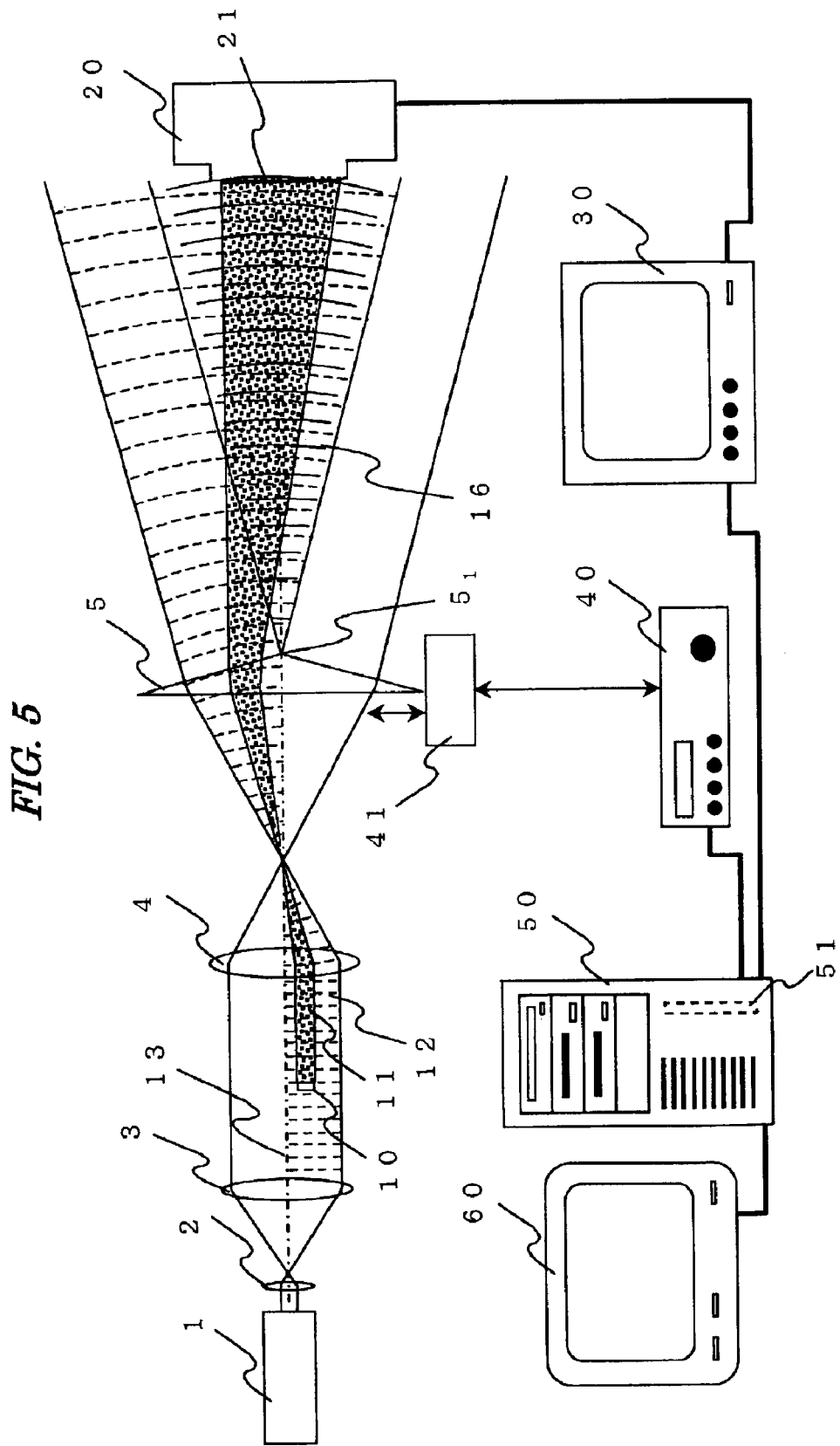
FIG. 5 is a diagram schematically showing the phenomenon that phase changes due to Fresnel diffracted waves are caused in a wavefront splitting type laser interference system.
Figure 10:
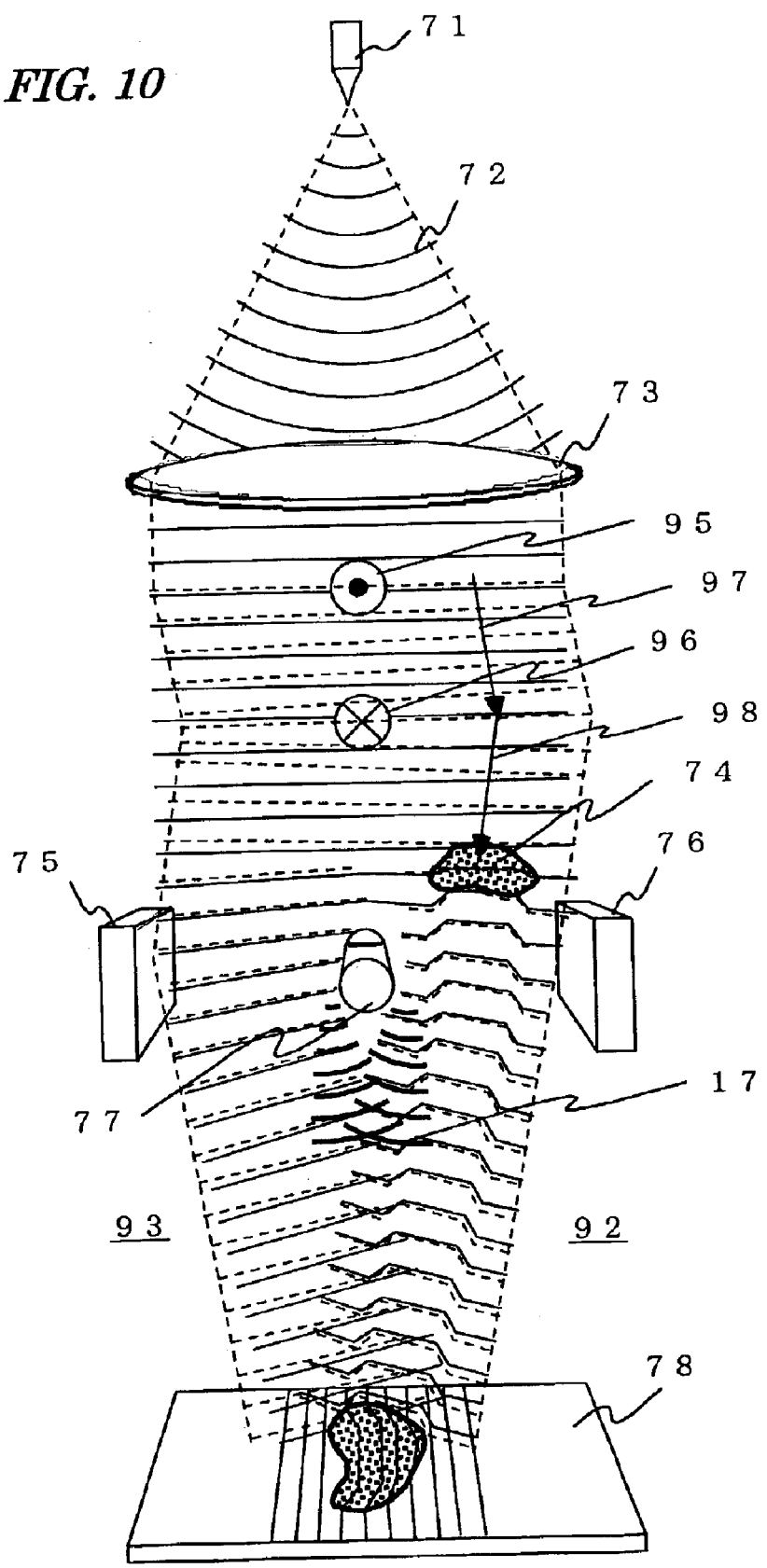
FIG. 10 is a diagram showing an example of a configuration of an embodiment in which the fringe scanning method by electron beam tilt has been applied to an electron beam interference measuring device.

A fifth embodiment is shown in FIG. 10. In the figure, the same components as those of the electron interference measuring device described by reference to FIG. 4 are provided with the same reference numerals. This device is implemented by applying the fringe scanning method based on an electron beam tilt to the electron interference measuring device, and shown in cross section along the electron beam axis. For simplification, only the outline from an electron beam source to an intermediate magnified surface is shown, and an electron optical system unnecessary for describing the principle, the details of the micro-movement mechanism of an electron beam biprism, a vacuum container, a magnifying lens system behind the intermediate magnified surface, power sources of an acceleration voltage, a lens, and a deflection system, and the like are omitted. Although there is an objective lens between the sample and the intermediate magnified surface, it is omitted in the figure because the optical system becomes complicated. Further, the instruments necessary for observation and measurement are the same as those of Embodiment 1. Therefore, these are also omitted. In Embodiment 5, as a means for removing the phase change distribution due to the interference element, there are included a mechanism for shifting the relative positional relationship between the sample image and the interference fringes on the observing plane by changing the tilt of the electron beam to be irradiated to the sample 74, and a calculating device (not shown) having functions of storing a first interference image, and a second interference image sifted in the relative positional relationship between the sample image and the interference fringes from the first interference image, and determining the phase distribution due to the sample to be measured by the interimage operation on a first phase distribution calculated from the first interference image and a second phase distribution calculated from the second interference image.

The electron beam 72 emitted from the electron beam source 71 is converted to a generally parallel beam by using the exposure lens 73, and the resulting beam is irradiated to the sample 74 placed in either half of the electron beam path. The electron beam transmitted through the sample 74 forms an image on the intermediate magnified surface 78 by an objective lens (not shown). The electron beam biprism made up of a thin central electrode 77 and a pair of flat ground electrodes 75 and 76 is placed between the objective lens and the intermediate magnified surface 78. The electron beams passed through the opposite sides of the central electrode 77 applied with a voltage of about +100 V are drawn by the electric field, and superimposed one on another in the region therebeneath. Therefore, a sample-side electron beam 92 (plane group slanting upwardly to the left) passed through the sample and a sample-less side reference electron beam 93 (plane group slanting upwardly to the right) interfere with each other to form an interference image made up of linear interference fringes only of which the sample image portion has undergone displacement on the intermediate magnified surface 78. At this step, Fresnel diffracted waves 17 are generated from the opposite sides of the thin electrode 77 of the electron beam biprism, and superimposed on the interference image.

A pair of upper and lower electron deflection systems are placed between the exposure lens 73 and the sample 74. The deflection systems are made up of an upper deflection system for effecting a magnetic field going from the back to the front of the paper plane as indicated by a reference numeral 95, and deflecting the electron beam rightward by a given angle on the paper plane as indicated by an arrow 97; and a lower deflection system for effecting a magnetic field going from the front to the back of the paper plane as indicated by a reference numeral 96, deflecting the electron beam leftward as indicated by an arrow 98 on the paper plane to undo the amount of deflection due to the upper deflection system, and making unchangeable the position of the sample plane through which the electron beam passes. Namely, a pair of the upper and lower electron beam deflection systems are configured so that the electron beam can be changed in angle of incidence to the sample 74 around the sample plane transmitting position as the rotation center when the electron beam passing through the portion of the sample 74 is expressed as a straight line. Herein, for easy observation in a schematic manner of the respective states of the deflected electron beam, an envelope in broken line is given, and the shift of the wavefront of the electron beam is shown by a broken line.

The central electrode 77 of the electron beam biprism and interference fringes formed on the intermediate magnified surface 78 are along the direction of the normal to the paper plane of the figure. If the rotation of the electron beam around the electron beam axis due to the objective lens is neglected for simplification, the electron beam is required to be deflected laterally in the figure for moving the interference fringes in the direction orthogonal to the direction of the fringes. For this, the deflection magnetic field must be along the direction of the normal to the paper plane.

In general, a magnetic field type of deflection system is used. However, if a coil or a magnetic path is shown, the figure inconveniently becomes complicated. Therefore, for the electron beam deflection system, only the generating magnetic field is shown as its direction. First, with the upper electron beam deflection system, a magnetic field going upwardly along the direction of the normal to the paper plane 95 is generated to deflect the electron beam rightward as indicated by a broken line. The lower electron beam deflection system generates a magnetic field going downwardly along the direction of the normal to the paper plane 96. In addition, the intensity of the magnetic field is adjusted so that the position of the sample through which the electron beam passes is unchanged before and after the deflection. As indicated by the broken line, the orbit of the electron beam is shifted as compared with that of the electron beam before deflection, and passes through different positions of the objective lens 81 and the electron beam biprism. However, as indicated from the fact that the scattered waves diverging from one point of the sample converge to one point on the image surface, the position of the sample through which the electron beam passes is unchangeable before and after deflection. Therefore, the image of the sample will not move. On the other hand, the irradiation direction to the electron beam biprism is tilted in the same manner as indicated by the arrow 98. Therefore, the center of the interference fringe group is shifted from on the electron beam onto the extension line connecting between the electron beam source and the central electrode. Accordingly, the interference fringes shift to the left with respect to the sample image in this case. The Fresnel diffracted waves generating from impingement of the electron beam on the central electrode are also shifted similarly in accordance with the shift of the irradiation direction.

While changing the amount of deflection of the electron beam so that the interference fringes are successively shifted by 1/M of the distance therebetween on the intermediate magnified surface 78 or the observing plane not shown, a total of M interference images are captured in a calculating device not shown. As a result, it becomes possible to perform the phase distribution calculation by the fringe scanning method in the same procedure as described above. Thus, herein, it is possible to carry out the present invention by using the already described method wherein (M+1) interference images successively shifted in the positions of the interference fringes by 1/M the distance with respect to each other are captured, or method wherein (K×M) (K is 2, M is a positive integer of 3 or more) interference images are captured, and these are divided into M×K sequences of interference image groups.

In this embodiment, the relative positional relationship between the sample and the interference fringes is shifted by changing the angle for sample irradiation. However, as described previously by reference to FIG. 4, needless to say, even if the foregoing operation is carried out by changing the positions of the electrodes 75, 76, and 77, or only the position of the central electrode 77 of the electron beam biprism, the same effects can be obtained to carry out this embodiment.

In this embodiment, the electron beam passes different positions of the objective lens, the electron beam biprism 75 to 77, and other electron-optical elements present in the regions other than on the plane equivalent to the sample plane not shown. Accordingly, all the phase changes resulting therefrom are shifted in accordance with the shift of the interference fringes. Therefore, it is possible to correct all the phase changes due to not only the electron beam biprism but also the electron-optical systems present behind the sample plane and in the regions other than the plane equivalent with the sample plane.

The electron beam deflection system for changing the angle of the incident electron beam around the sample incidence point as the center is operated in the following two manners. A first method is as follows. The ratio of the respective numbers of turns of the coils is determined so that the respective amounts of deflection due to the upper and lower coils determined according to the positional relationship between the upper and lower coils and the sample are equal to each other. Connection in series is established so that the respective magnetic fields generated by the upper and lower coils are mutually opposite in direction. Thus, a current is supplied from one direct current source. A second method is as follows. The upper and lower coils are respectively connected to different current sources, and thereby individually operated with an appropriate current ratio. Further, both of the methods may also be employed in combination. Herein, the electron beam deflection systems have been described as if they are of one system. However, even the deflection system of x-y two systems is acceptable without any inconvenience so long as it is capable of moving the interference fringes in the direction orthogonal to the direction thereof.

Incidentally, the exposure lens system 73 is, in most cases, made up of two-stage or three-stage electron lenses. However, in this description, only one stage is shown for illustration. Further, needless to say, there is no change in principle even if there is another one-, or more-stage magnifying lens between the objective lens and the electron beam biprism.

The case where the method for tilting the beam is implemented by a laser interferometer is different from the foregoing case in principle and mechanism for tilting the beam. However, apparently, it is identical thereto in terms of the following aspects: occurrence of shift in the position through which the beam passes and the interference fringes; the resultant applicability of the present invention; the merit that it is also possible to correct the phase changes due to optical components situated behind the sample plane and in regions other than the plane equivalent to the sample plane together; etc.

Up to this point, the following method has been described. Namely, the phase distribution due to the sample and the phase distribution due to the interferometer are separated from each other from the difference between the first and second phase distributions respectively calculated from the first and second interference image (groups) having mutually shifted relative positional relationships each between the sample image and the interference fringes. The fundamental requirement for this method is that only either of the phase distribution due to the sample and the phase distribution due to the interferometer is shifted in accordance with the shift in the relative phase relationship. This corresponds to the lateral shift in the positional relationship between the sample and the optical system components not directly involved in the formation of the sample image. Therefore, also in general interference systems such as the Michelson interferometer shown in FIG. 1 on page 56 of the reference literature 1 and the Mach-Zehnder interferometer shown in FIG. 1 of the reference literature 3, if the reflecting mirror, the semitransparent mirror, or the like is laterally shifted, only the phase change due to the component is laterally shifted with respect to the sample image. Further, as shown for the electron beam interference system, if the tilt of the beam to be irradiated to the sample is changed, only the phase change due to the interference system is shifted because the beam passes through the different positions of the optical components not situated on the sample plane or its equivalent plane. Namely, even in any interference measuring device, if a mechanism for laterally shifting the positional relationship between the sample and the optical system components not directly involved in the formation of the sample image is included, and a calculation processing is performed on the first and second phase distributions calculated from the first and second interference image (groups) having mutually shifted in the positional relationship in accordance with the foregoing method, it is possible to separate and extract the phase change due to the sample and the phase change due to the interference system.

(Application to Evaluation of Waveguide)

Below, in order to evaluate an optical waveguide by means of the interference measuring device in accordance with the present invention, a description will be given to an application example in which the refractive index distribution of the cross section of the optical waveguide is measured.

Figure 11A:
FIGS. 11A to 11E are diagrams for schematically showing the steps of one example of a method for forming an optical waveguide.
Figure 11B:
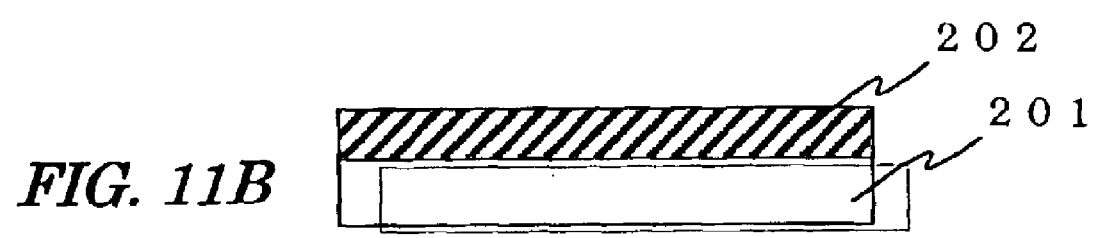
Figure 11C:
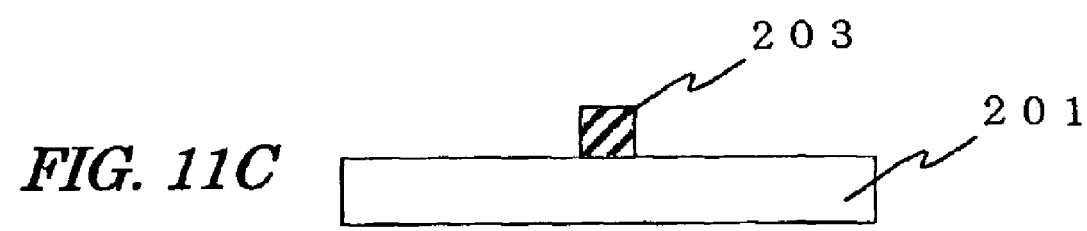
Figure 11D:
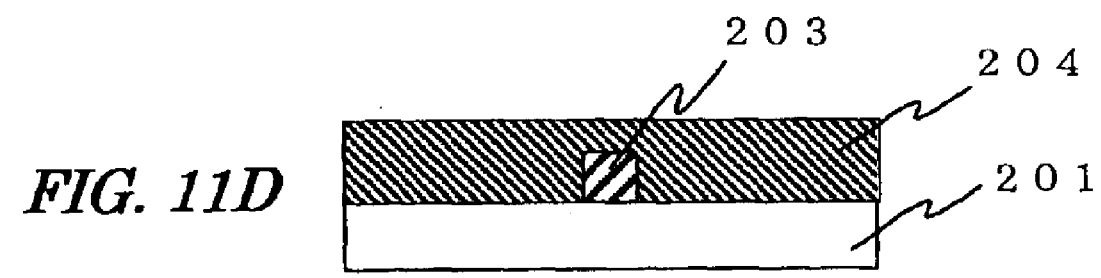
Figure 11E:
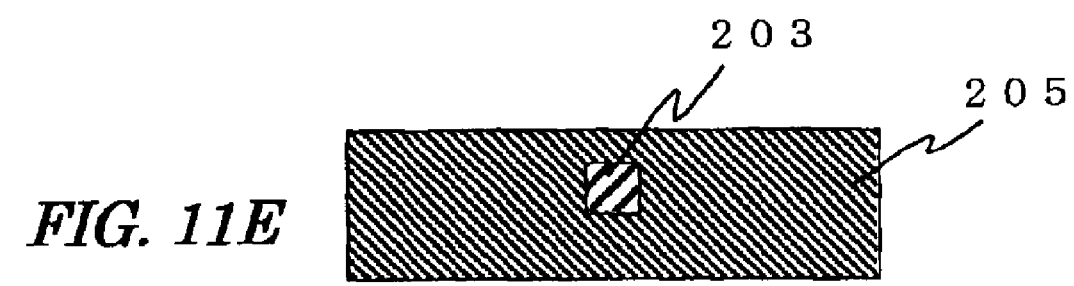

FIGS. 11A to 11E are views schematically showing one example of a method for forming an optical waveguide. First, as shown in FIG. 11A, a quartz substrate 201 is prepared. As shown in FIG. 11B, on the substrate 201, a ($SiO_2+TiO_2$) layer 202 with a prescribed thickness, which will be the optical waveguide, is formed. The amount of $TiO_2$ is selected to be about 1 Wt % so that the difference in refractive index between the substrate 201 and the optical waveguide layer 202 is 0.3%. On the ($SiO_2+TiO_2$) layer 202, a mask is formed with a resist layer, and only the linear region of the resist layer corresponding to the optical waveguide is left by photolithography, and reactive ion etching (RIE) is performed thereon to form an optical waveguide 203 as shown in FIG. 11C. Then, as shown in FIG. 11D, a layer 204 of $SiO_2$ particles containing phosphorus (P) and boron (B) as dopants is deposited thereon by FHD (flame hydrolysis deposition). Finally, the whole is subjected to a heat treatment at about 1200° C., thereby to make transparent the whole 205 of the substrate 201 and the deposition layer 204.

P and B doping reduces the softening temperature. P has a function of increasing the refractive index, and B has a function of decreasing the refractive index. Therefore, the amounts of P and B contained in the deposition layer 204 are controlled so that softening of the substrate 201 and the optical waveguide 204 during the heat treatment for higher transparency is minimized, and so that the refractive index of the deposition layer 204 becomes equal to that of the substrate 201.

As the characteristics of the optical waveguide, desirably, the refractive index sharply changes at the boundary of the waveguide portion, so that optical signals are localized into the waveguide. However, there are pointed out the possibility that the particles containing P in larger amounts first soften, when the deposition layer 204 softens during the manufacturing process, to form a P-rich layer at the boundary with the substrate 201 and the possibility that the refractive index distribution is broadened by diffusion of added components. However, hitherto, the measurement of such a refractive index distribution has been carried out in the following manner. For example, how much the transmitted optical signal is attenuated at the output side is determined. Alternatively, an observation is performed under an interference microscope, so that a judgment is made based on the manner in which the interference fringes are curved. Therefore, these methods cannot be said to be adequate evaluation methods.

However, if the present invention is applied thereto, it is possible to directly observe and measure the refractive index distribution. First, for description of the observation principle, a consideration will be given to the phase change resulting from the difference in refractive index. The number of waves N present in a waveguide is represented by the following equation (19):

$$N = \frac{t}{\lambda_2} \tag{19}$$

where $n_2$ denotes the refractive index of the waveguide, t denotes the thickness along the optical path of the waveguide, and $\lambda_2$ denotes the wavelength of a laser light within the waveguide. If it is assumed that the refractive index of the clad portion is $n_1$, and the wavelength thereof is $\lambda_1$, the phase shift per period of the wave is represented on a wavelength basis by the following expression (20):

$$\frac{\lambda_1 - \lambda_2}{\lambda_1} \qquad (20)$$

The refractive index n of a substance is expressed as the ratio of wavelength $\lambda$ in the substance to wavelength $\lambda_0$ in vacuum, i.e., the following equation (21):

$$n = \frac{\lambda_0}{\lambda} \qquad (21)$$

Therefore, the phase shift $\Delta\phi$ [rad] when the light has passed through the waveguide is expressed as the following equation (22):

$$\begin{aligned}\Delta\phi &= \frac{2\pi N(\lambda_1 - \lambda_2)}{\lambda_1} \\ &= 2\pi \frac{t}{\lambda_1} \frac{\lambda_1 - \lambda_2}{\lambda_2} \\ &= 2\pi t \frac{n_2 - n_1}{n_1} \frac{n_1}{\lambda_0}\end{aligned} \qquad (22)$$

Figure 12:
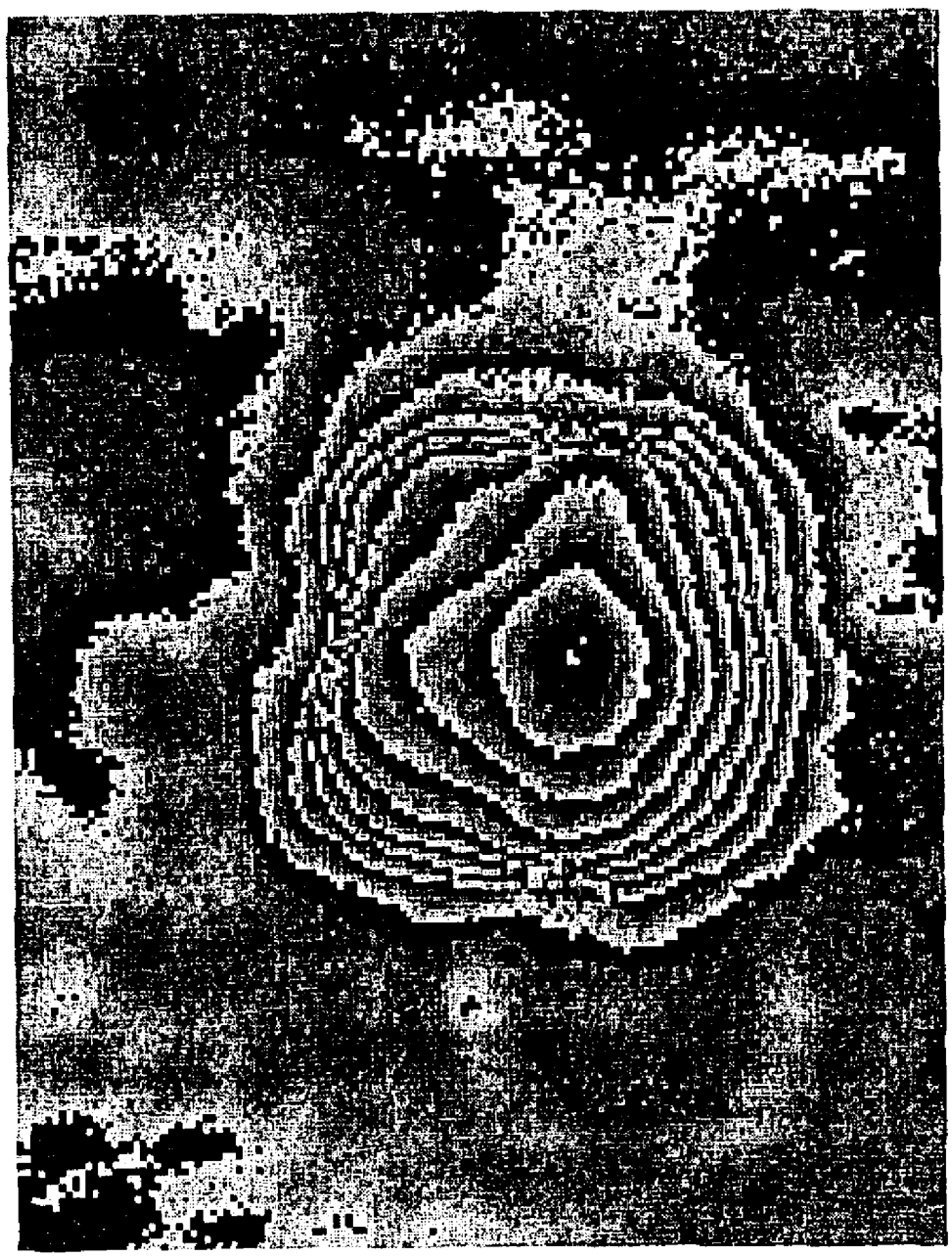
FIG. 12 is a view showing the observation result of the phase distribution of the sliced cross section of an optical waveguide sample.

FIG. 12 is the observation result of the sliced cross section of an optical waveguide sample. The contour lines are drawn for every $1/10$ the wavelength phase change. A 5-$\mu$m scale is shown in the right-hand corner under the figure. The bottom side of the generally rectangular shape is the interface with the quartz substrate 201. The difference in refractive index between the waveguide central portion 203 and the clad layer 205 is 0.3% for this sample. Therefore, it is possible to read the difference in refractive index of about $5\times10^{-5}$ from the phase distribution. This enables the close measurements of the uniformity of the refractive index within the waveguide or within the transparent layer, and the like.

Figure 13:
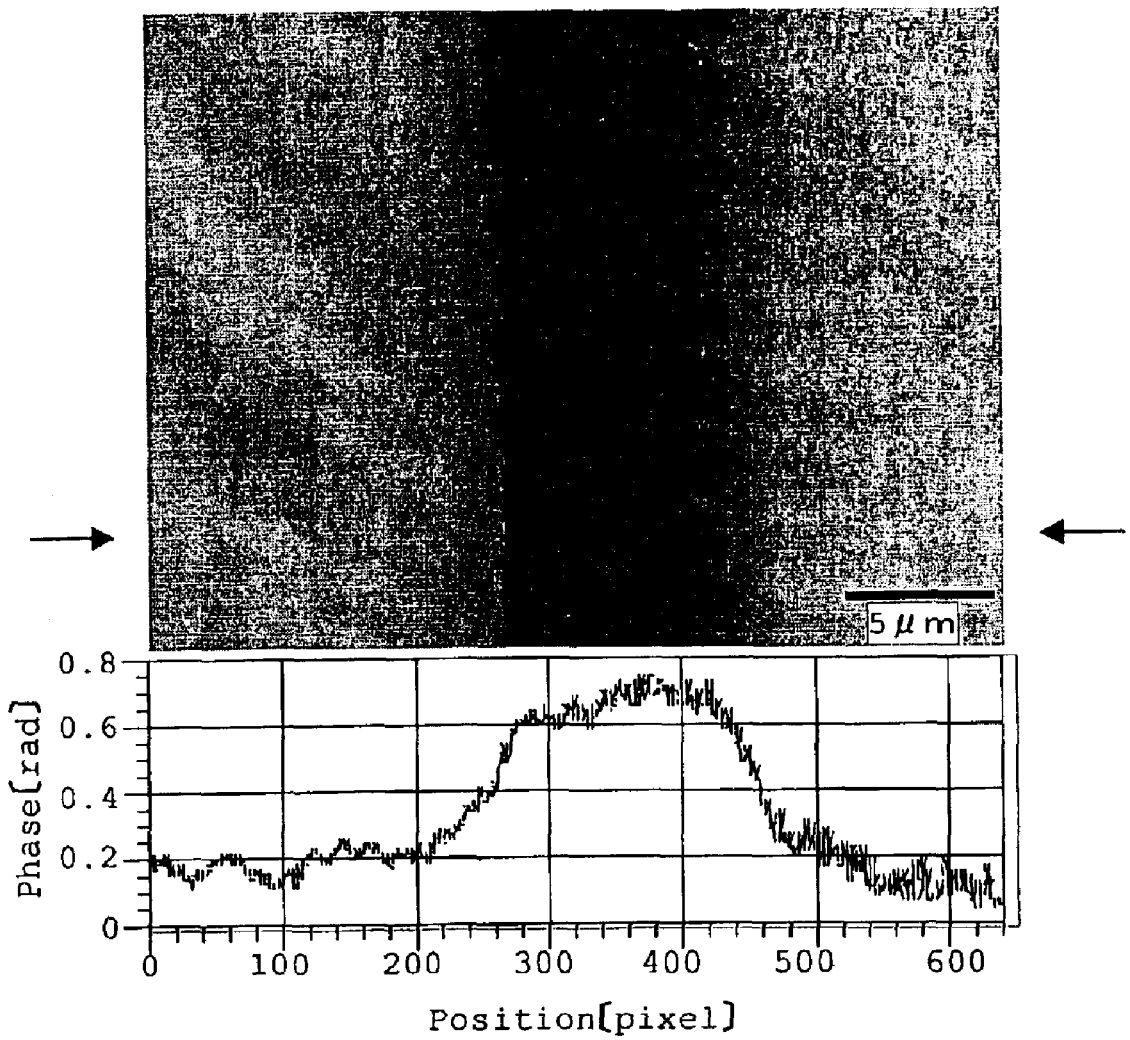
FIG. 13 is a view showing the result obtained by observing the optical waveguide from above, of which the observation result of the cross section is shown in FIG. 12.

FIG. 13 is a view showing the result obtained by observing the optical waveguide from above, of which the observation result of the cross section is shown in FIG. 12. The dark band region is the waveguide 203. The graph shown in the lower column in the figure shows the phase profile of the region at the position indicated by arrows shown in the left and right margins of FIG. 13. It is possible to read the phase change amount of each region from the profile. Therefore, it is possible to measure the distribution of the refractive index from the equation (22) if the refractive index of the clad portion is known.

In accordance with the first method of the present invention, it becomes possible to remove the phase change due to the Fresnel diffracted waves generated from the wavefront splitting boundary of the biprism in the interference measuring device belonging to the wavefront splitting type, or the Fresnel diffracted waves in the interference measuring device using an electron beam in the following manner. Namely, a beam shielding plate in such a form as to shield the wavefront splitting boundary is set on the plane equivalent to the observing plane, to be formed between the coherent beam source and the biprism. Further, in accordance with the second or third method of the present invention, the removal can be performed mathematically from the two phase distribution data respectively obtained from the two sequences of interference image (groups) mutually shifted in relative positional relationship between the sample and the interference fringes.

What we claim is:

1. An interference measuring device, comprising: a coherent beam generating source; a sample to be measured; a lens system for forming an image of the sample to be measured on an observing plane; a wavefront splitting element for splitting a coherent beam into two systems, and forming an interference image on the observing plane or a plane equivalent thereto; an image pickup element for picking up the interference image on the observing plane; a calculating device having functions of capturing and storing the interference image converted to electric signals by the image pickup element, and determining the phase distribution changed by the sample to be measured from the interference image by calculation; and a beam shielding plate for acting as a shield against a beam to be irradiated to the wavefront splitting boundary of the interference element on a plane equivalent to the observing plane between the coherent beam generating source and the interference element, or in the vicinity thereof.

2. The interference measuring device according to claim 1, wherein the interference element is a wavefront splitting element, the means for removing the phase change distribution due to the interference element is a beam shielding plate for acting as a shield against a beam to be irradiated to the wavefront splitting boundary of the interference element on a plane equivalent to the observing plane between the coherent beam generating source and the interference element, or in the vicinity thereof, and a means for shifting the relative positional relationship between the sample image and interference fringes on the observing plane is included.

3. The interference measuring device according to claim 1, wherein the coherent beam is a laser light; an interferometer is a pole-like prism having a triangular cross sectional shape, or a cross sectional shape made up of combined triangles with the wavefront splitting boundary as the boundary therebetween; and the lens system is an optical lens system.

4. The interference measuring device according to claim 1, wherein the coherent beam is an electron beam, the interferometer is an electron beam biprism, and the lens system is an electron lens system.

5. The interference measuring device according to claim 1, wherein the beam shielding plate is a wavefront-splitting-boundary beam shielding plate to cast a shadow on and prevent generation of Fresnel fringes from the wavefront splitting boundary.

6. The interference measuring device according to claim 1, wherein the beam shielding plate shielding the beam to be irradiated to the wavefront splitting boundary of the interference element, while not shielding the beam to be irradiated to portions of the interference element other than the wavefront splitting boundary.

7. An interference measuring device, comprising: a coherent beam generating source; a sample to be measured; a lens system for forming an image of the sample to be measured on an observing plane; an interference element for splitting a coherent beam into two systems, and forming an interference image on the observing plane or a plane equivalent thereto; an image pickup element for picking up the interference image on the observing plane; a calculating device having functions of capturing and storing the interference image converted to electric signals by the image pickup element, and determining the phase distribution changed by the sample to be measured from the interference image by calculation; and a mechanism for shifting the relative positional relationship between the sample image and interference fringes on the observing plane for removing the phase change distribution due to the interference element, wherein the calculating device stores a first interference image, and a second interference image shifted in relative positional relationship between the sample image and the interference fringes from the first interference image, and integrates the difference between a first phase distribution calculated from the first interference image and a second phase distribution calculated from the second interference image, and the resulting information or information obtained by subtracting it from the first or second phase distribution is the phase distribution obtained by removing the phase distribution due to an interferometer from the phase distribution on the observing plane.

8. The interference measuring device according to claim 7, wherein the mechanism for causing a shift in the relative positional relationship between the sample image and the interference image moves the interference element.

9. The interference measuring device according to claim 7, wherein the mechanism for causing a shift in the relative positional relationship between the sample image and the interference image changes the tilt of a coherent beam to be irradiated to the sample.

10. The interference measuring device according to claim 7, wherein the mechanism for causing a shift in the relative positional relationship between the sample image and the interference image moves the sample within a plane orthogonal to the optical axis, and in a memory of the calculating device, the data of position of any of the first phase distribution and the second phase distribution is shifted in the direction of shift in the relative positional relationship between the first interference image and the second interference image by the shift amount.

11. The interference measuring device according to claim 8, wherein the mechanism for causing a shift in the relative positional relationship between the sample image and the interference image moves the interference element.

12. The interference measuring device according to claim 8, wherein the mechanism for causing a shift in the relative positional relationship between the sample image and the interference image changes the tilt of a coherent beam to be irradiated to the sample.

13. The interference measuring device according to claim 8, wherein the mechanism for causing a shift in the relative positional relationship between the sample image and the interference image moves the sample within a plane orthogonal to the optical axis, and in a memory of the calculating device, the data of position of any of a first phase distribution calculated after aligning the sample position in each interference image of the first interference image group with that in the first interference image of the group and a second phase distribution calculated after aligning the sample position in each interference image of the second interference image group with that in the first interference image of the group is shifted in the direction of shift in the relative positional relationship between the first interference image of the first interference image group and the first interference image of the second interference image group by the shift amount.

14. The interference measuring device according to claim 7, wherein the mechanism for causing a shift in the relative positional relationship between the sample image and the interference image moves the sample within a plane orthogonal to the optical axis, and in a memory of the calculating device, the data of position of any of the first phase distribution and the second phase distribution is shifted in the direction of shift in the relative position relationship between the first interference image and the second interference image by the shift amount.

15. An interference measuring device, comprising: a coherent beam generating source; a sample to be measured; a lens system for forming an image of the sample to be measured on an observing plane; an interference element for splitting a coherent beam into two systems, and forming an interference image on the observing plane or a plane equivalent thereto; an image pickup element for picking up the interference image on the observing plane; a calculating device having functions of capturing and storing the interference image converted to electric signals by the image pickup element and determining the phase distribution changed by the sample to be measured from the interference image by calculation; and a mechanism for shifting the relative positional relationship between the sample image and interference fringes on the observing plane for removing the phase change distribution due to the interference element, wherein the calculating device stores a first interference image group, and a second interference image group starting from an interference image shifted in relative positional relationship between the sample image and interference fringes from the first interference image of the first interference image group, and integrates the difference between a first phase distribution calculated from the first interference image group and a second phase distribution calculated from the second interference image, and the resulting information or information obtained by subtracting it from the first or second phase distribution is the phase distribution obtained by removing the phase distribution due to an interferometer from the phase distribution on the observing plane, wherein (K×M) interference images having positional relationships each between the interference fringes and the sample successively shifted by 1/(K×M) with respect to each other, where K is a positive integer of 2 or more, k is a variable changing from 1 to K, M is a positive integer of 3 or more, and m is a variable changing from 1 to M, are sequentially captured in the calculating device such that respective numbers are understandable; the interference images having their respective numbers each represented by the relational expression of $\{(m-1)K+k\}$, for k being from 1 to K, where m is from 1 to M, are grouped, and thereby classified into K sequences of interference image groups; and the given two sequences of the K sequences of interference image groups are set to be the first interference image group and the second interference image group.

16. The interference measuring device according to claim 15, wherein the mechanism for causing a shift in the relative positional relationship between the sample image and the interference image moves the sample within a plane orthogonal to the optical axis, and in a memory of the calculating device, the data of position of any of a first phase distribution calculated after aligning the sample position in each interference image of the first interference image group with that in the first interference image of the group and a second phase distribution calculated after aligning the sample position in each interference image of the second interference image group with that in the first interference image of the group is shifted in the direction of shift in the relative positional relationship between the first interference image of the first interference image group and the first interference image of the second interference image group by the shift amount.

17. The interference measuring device according to claim 15, wherein the interference fringes on the observing plane are successively shifted by 1/M (>=3) of the distance therebetween to record an (M+1)-interference-image group, and a first interference image group is set to include the first M-th image of the (M+1)-interference-image group, and a second interference image group is set to include the second to (M+1)-th images of the (M+1)-interference-image group.

18. The interference measuring device according to claim 15, wherein the mechanism for causing a shift in the relative positional relationship between the sample image and the interference image moves the interference element.

19. The interference measuring device according to claim 15, wherein the mechanism for causing a shift in the relative positional relationship between the sample image and the interference image changes the tilt of a coherent beam to be irradiated to the sample.

20. The interference measuring device according to claim 15, wherein the coherent beam is a laser light; an interferometer is a pole-like prism having a triangular cross sectional shape, or a cross sectional shape made up of combined triangles with the wavefront splitting boundary as the boundary therebetween; and the lens system is an optical lens system.

21. The interference measuring device according to claim 15, wherein the coherent beam is an electron beam, the interferometer is an electron beam biprism, and the lens system is an electron lens system.

* * * * *